(12) United States Patent
Ito

(10) Patent No.: US 9,880,673 B2
(45) Date of Patent: Jan. 30, 2018

(54) MULTI-TOUCH INPUT INFORMATION PROCESSING APPARATUS, METHOD, AND STORAGE MEDIUM

(71) Applicant: CANON KABUSHIKI KAISHA, Tokyo (JP)

(72) Inventor: Hikaru Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/776,278

(22) Filed: Feb. 25, 2013

(65) Prior Publication Data

US 2013/0222340 A1    Aug. 29, 2013

(30) Foreign Application Priority Data

Feb. 28, 2012    (JP) ................................ 2012-041603

(51) Int. Cl.
    *G06F 3/044*    (2006.01)
    *G06F 3/0488*    (2013.01)

(52) U.S. Cl.
    CPC ............ *G06F 3/044* (2013.01); *G06F 3/0488* (2013.01); *G06F 2203/04806* (2013.01); *G06F 2203/04808* (2013.01)

(58) Field of Classification Search
    CPC ............................................. G06F 2203/04104
    See application file for complete search history.

(56) References Cited

U.S. PATENT DOCUMENTS

| 5,952,998 | A  | * | 9/1999  | Clancy et al. ................ 345/173 |
| 7,138,983 | B2 |   | 11/2006 | Wakai |
| 8,217,909 | B2 |   | 7/2012  | Young |
| 2008/0165141 | A1 |   | 7/2008 | Christie |
| 2009/0096753 | A1 |   | 4/2009 | Lim |
| 2009/0273579 | A1 | * | 11/2009 | Zachut et al. ................ 345/174 |
| 2010/0064262 | A1 | * | 3/2010 | Liao .............................. 715/863 |
| 2010/0259493 | A1 |   | 10/2010 | Chang |
| 2011/0032192 | A1 |   | 2/2011 | Mills et al. |
| 2011/0202834 | A1 | * | 8/2011 | Mandryk et al. ............. 715/701 |
| 2011/0205169 | A1 |   | 8/2011 | Yasutake |

(Continued)

FOREIGN PATENT DOCUMENTS

| CN | 101667089 A | 3/2010 |
| CN | 202142028 U | 2/2012 |

(Continued)

*Primary Examiner* — Gene W Lee
(74) *Attorney, Agent, or Firm* — Canon USA Inc., IP Division

(57) ABSTRACT

A control method for an information processing apparatus configured to acquire position information of one or more touched points one by one detected according to a predetermined detection period on a touch panel includes holding the position information of each of the one or more touched points in a holding unit, acquiring a number of the touched points whose position information is held in the holding unit, determining at each predetermined detection period that latest position information of all the touched points whose position information is held in the holding unit is specified, in a case where the number of the acquired touched point is two or more, and deciding the multi-touch operation performed to the information processing apparatus after the determination.

8 Claims, 11 Drawing Sheets

(56) References Cited

U.S. PATENT DOCUMENTS

| | | | |
|---|---|---|---|
| 2011/0225524 A1* | 9/2011 | Cifra | G06F 3/04883 715/763 |
| 2011/0279396 A1 | 11/2011 | Wakai | |
| 2011/0298724 A1* | 12/2011 | Ameling | G06F 3/04883 345/173 |
| 2012/0068950 A1 | 3/2012 | Conde et al. | |
| 2012/0206380 A1 | 8/2012 | Zhao et al. | |
| 2012/0223898 A1 | 9/2012 | Watanabe et al. | |
| 2013/0016103 A1 | 1/2013 | Gossweiler, III et al. | |
| 2013/0021261 A1* | 1/2013 | Wilson | G06F 15/0291 345/173 |
| 2013/0147731 A1 | 6/2013 | Adachi | |
| 2014/0019860 A1* | 1/2014 | Sathish | G06F 3/038 715/716 |

FOREIGN PATENT DOCUMENTS

| | | |
|---|---|---|
| EP | 2169529 A2 | 3/2010 |
| EP | 2378403 A1 | 10/2011 |
| JP | 2001290585 A | 10/2001 |
| JP | 2011-059952 A | 3/2011 |
| JP | 2011-59952 A | 3/2011 |
| JP | 2011070250 A | 4/2011 |
| RU | 2417399 C2 | 4/2011 |
| RU | 2435194 C2 | 11/2011 |

\* cited by examiner

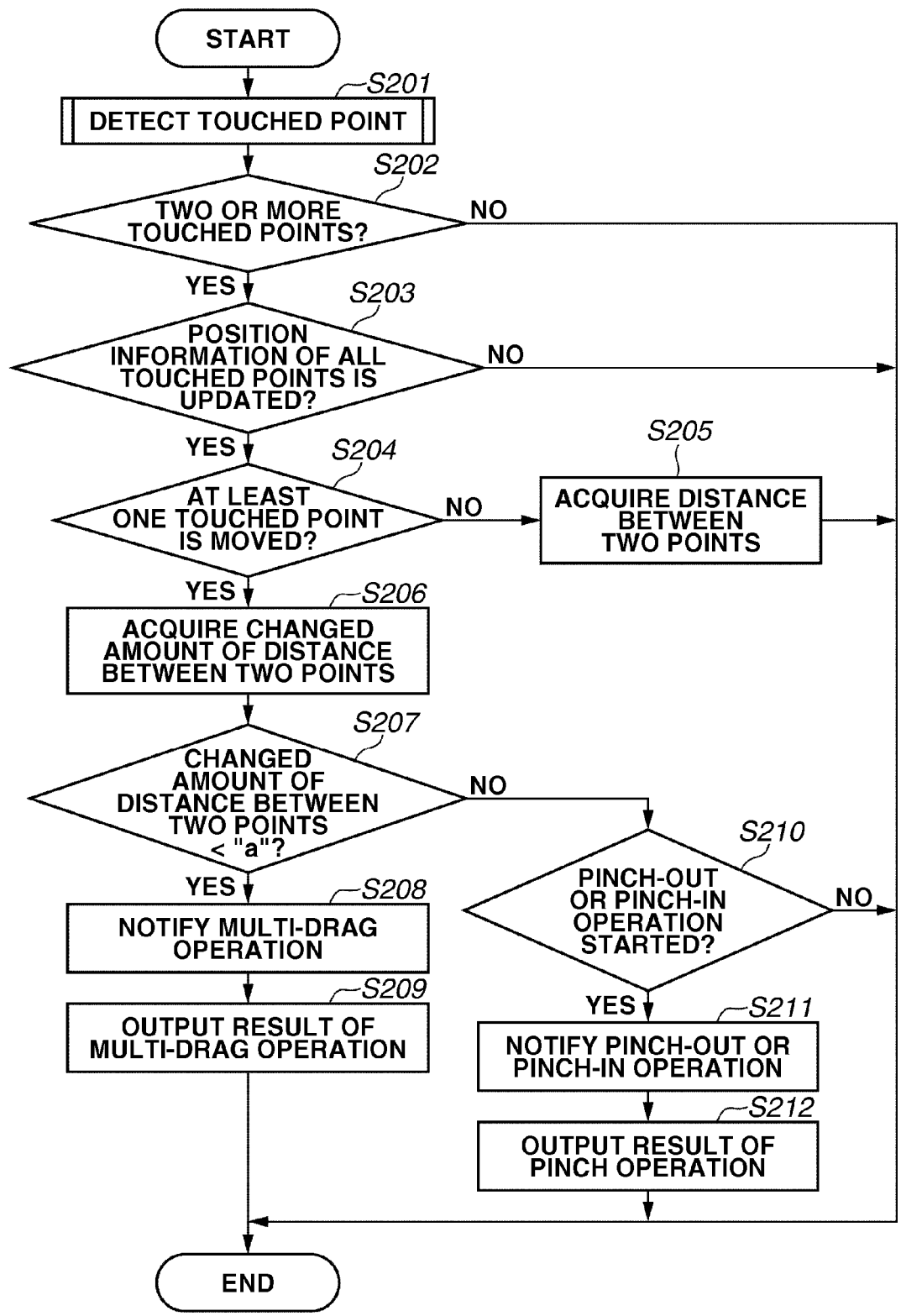

FIG.5A

| ID | X[dot] | Y[dot] | Time[msec] |
|---|---|---|---|
| 1 | 100 | 50 | 0 |

FIG.5B

| ID | X[dot] | Y[dot] | Time[msec] |
|---|---|---|---|
| 1 | 100 | 50 | 0 |
| 2 | 110 | 40 | 5 |

FIG.5C

| ID | X[dot] | Y[dot] | Time[msec] |
|---|---|---|---|
| 1 | 200 | 50 | 20 |
| 2 | 110 | 40 | 5 |

FIG.5D

| ID | X[dot] | Y[dot] | Time[msec] |
|---|---|---|---|
| 1 | 200 | 50 | 20 |
| 2 | 210 | 40 | 25 |

FIG.5E

| ID | X[dot] | Y[dot] | Time[msec] |
|---|---|---|---|
| 1 | 300 | 50 | 40 |
| 2 | 210 | 40 | 25 |

FIG.5F

| ID | X[dot] | Y[dot] | Time[msec] |
|---|---|---|---|
| 1 | 300 | 50 | 40 |
| 2 | 310 | 40 | 45 |

| ID | X[dot] | Y[dot] | Time[msec] |
|---|---|---|---|
| 1 | 100 | 50 | 0 |

| ID | X[dot] | Y[dot] | Time[msec] |
|---|---|---|---|
| 1 | 100 | 50 | 0 |
| 2 | 110 | 40 | 5 |

| ID | X[dot] | Y[dot] | Time[msec] |
|---|---|---|---|
| 1 | 100 | 50 | 0 |
| 2 | 210 | 40 | 25 |

| ID | X[dot] | Y[dot] | Time[msec] |
|---|---|---|---|
| 1 | 100 | 50 | 0 |
| 2 | 310 | 40 | 45 |

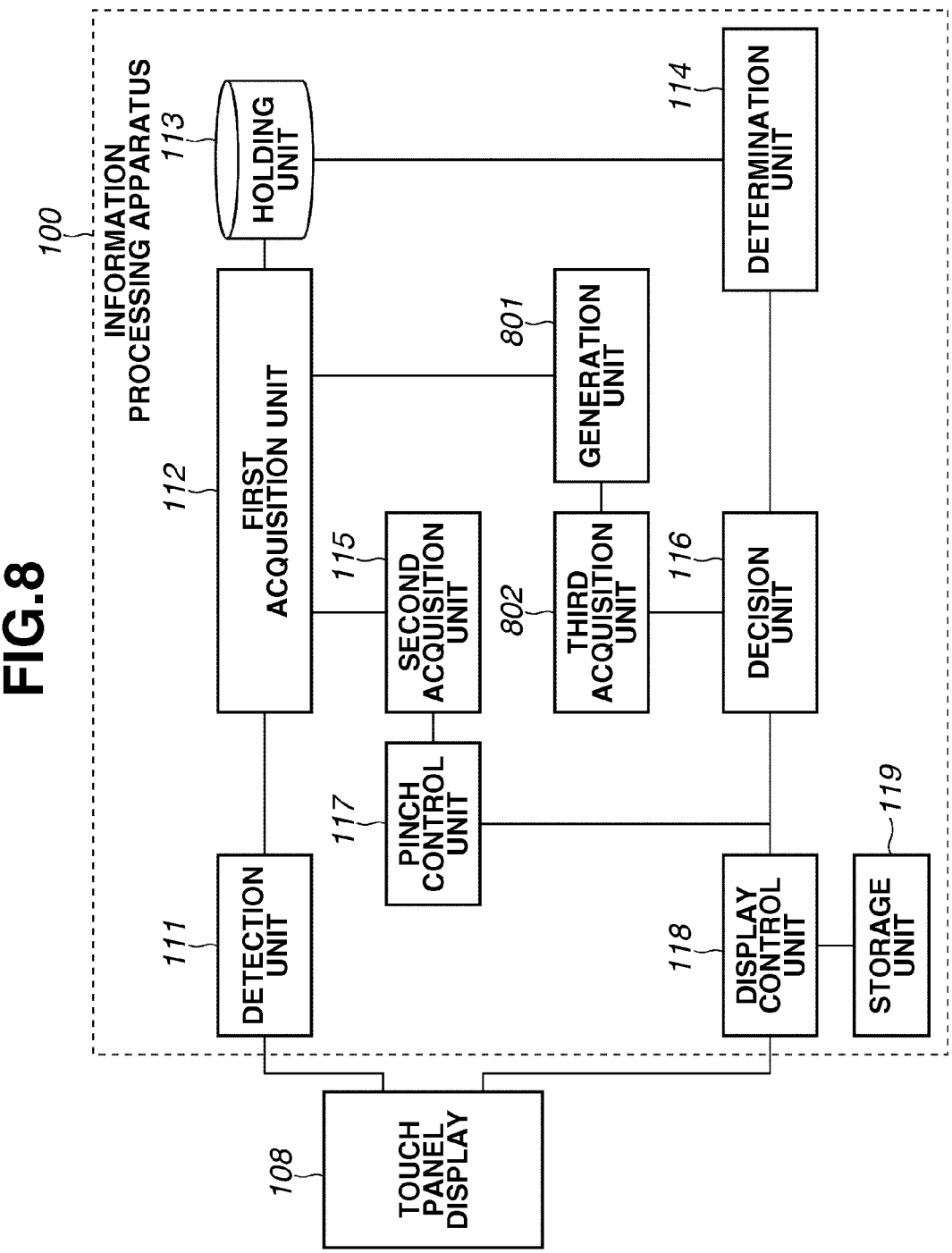

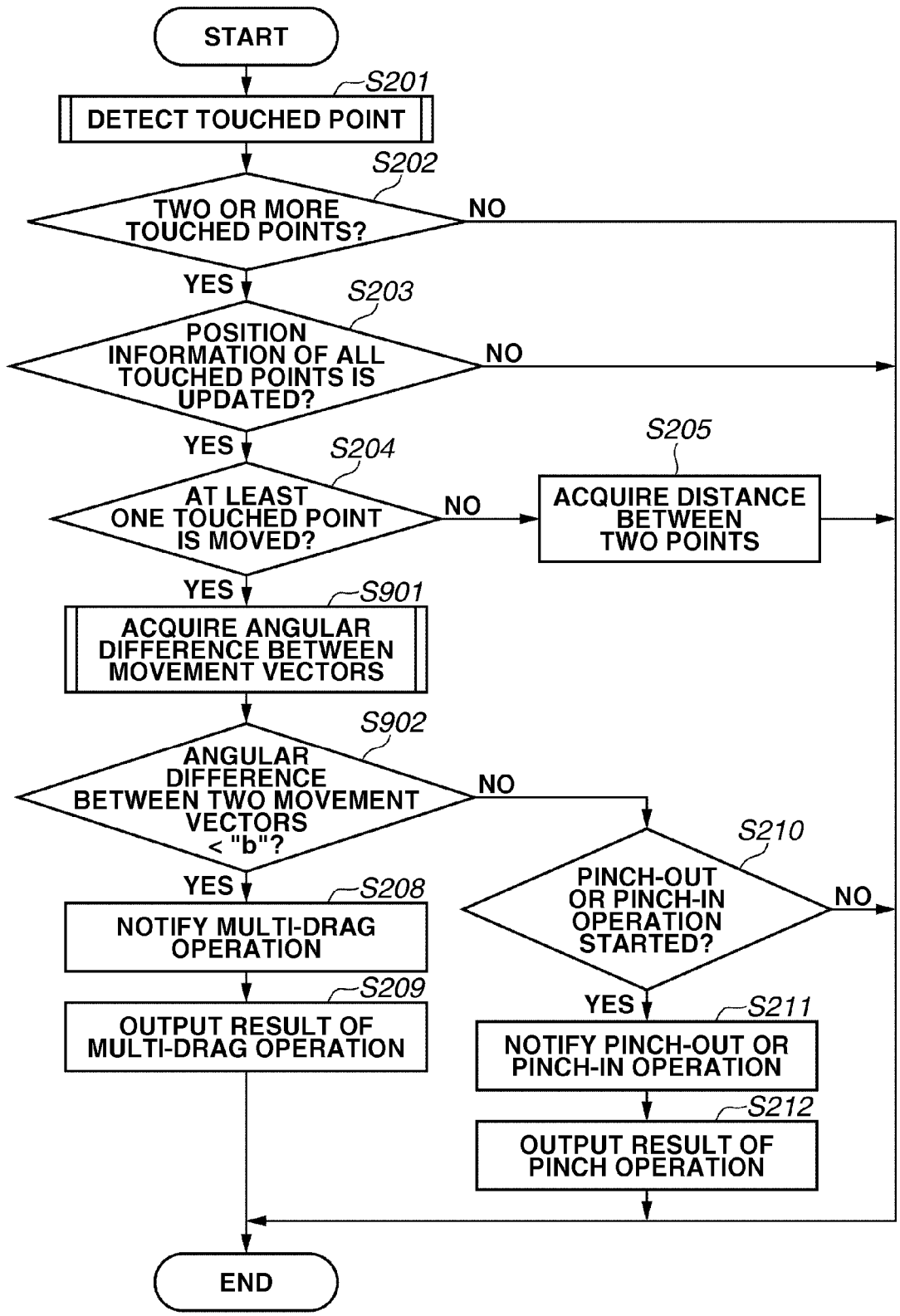

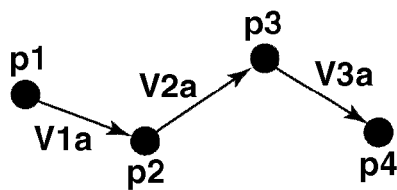
FIG.11A
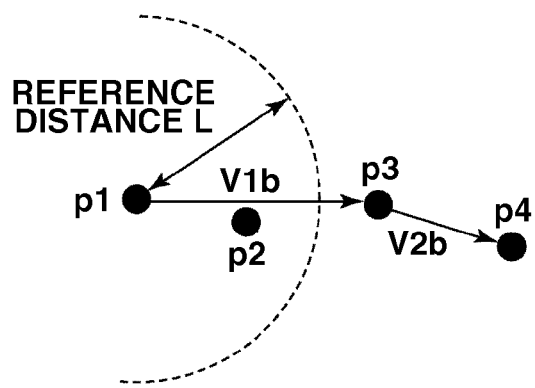
FIG.11B
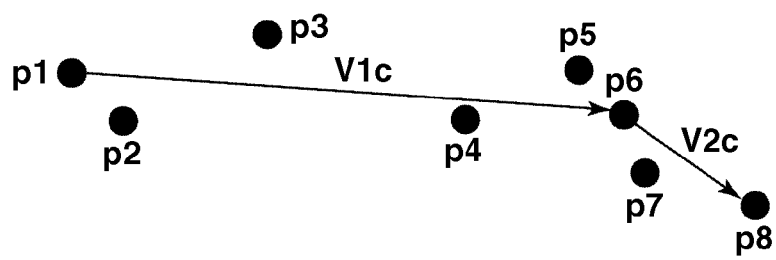
FIG.11C
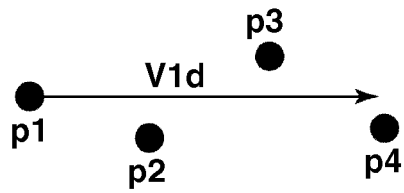
FIG.11D
FIG.11E
FIG.11F
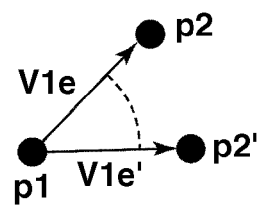
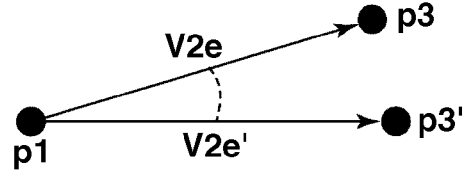

MULTI-TOUCH INPUT INFORMATION PROCESSING APPARATUS, METHOD, AND STORAGE MEDIUM

BACKGROUND OF THE INVENTION

Field of the Invention

The present invention relates to a technique for improving false operations in an apparatus to which a multi-touch operation is possible.

Description of the Related Art

Recently, touch input apparatuses have become widely used, which receives, in response to a user's touch of a screen by a finger or a stylus, X, Y coordinate values of the touched position as input values to perform various processing based on the input values.

Further, recently, a multi-touch technique in which an operation is performed by touching a plurality of points on a screen has been developing. Commonly, as a multi-touch operation to a touch panel, an operation of moving two points where a user is touching closer or away is referred to as a "pinch" operation. Among the operations, the operation of moving the two points closer is called a "pinch-in" operation, and with this operation, the displayed image is reduced. On the other hand, the operation of moving two points away is referred to as a "pinch-out" operation, and with this operation, the displayed image is enlarged.

In a technique discussed in Japanese Patent Application Laid-open No. 2011-059952, when at least one of two fingers touching a screen moves, a pinch operation is recognized according to the change of distance between the two fingers, and enlargement ratio of an image is changed, and simultaneously the displayed image is scrolled according to the movement direction of the finger.

SUMMARY OF THE INVENTION

The present invention relates to an information processing apparatus, in which a multi-touch operation is possible, capable of reducing false operations performed against the user's intention in the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a processing flow performed by the information processing apparatus for recognizing a multi-touch operation.

FIGS. 5A to 5F are tables illustrating examples of information held for the detected touched points.

FIG. 8 is a block diagram illustrating an example function configuration of the information processing apparatus.

FIG. 9 is a flowchart illustrating a flow for recognizing a multi-touch operation by the information processing apparatus.

FIGS. 11A to 11F are diagrams illustrating example distributions of touched points detected when a user performs touch operations.

DESCRIPTION OF THE EMBODIMENTS

Various exemplary embodiments, features, and aspects of the invention will be described in detail below with reference to the drawings.

Exemplary embodiments described below are mere examples and not limited thereto.

In a first exemplary embodiment, a multi-touch state is assumed. In the multi-touch state, a user touches two points at a time point. An example is described, in which an operation content performed by a user to an information processing apparatus 100 is determined in response to a completion of an update of position information of all two points, in order to recognize a multi-touch operation meeting a user's intention.

A case is described as an example multi-touch operation where a user intends to move two touched points in a same direction while keeping the distance therebetween (hereinbelow, referred to as a "multi-drag" operation).

Heretofore, in order to recognize a multi-touch operation, information of a touched point detected by a touch panel is notified one by one, and processing is performed based on the position information obtained for each point. Accordingly, among two touched points moved by a user to perform a multi-drag operation, at a time point when a position after a first point is moved is obtained, a position of a second touched point before moving is held. As a result, it is determined that the "distance between two points" is increased by the distance corresponding to the movement amount of the user's finger.

Then, at a time point when the position of the second point after moving is obtained, the distance between the two points has returned to the distance before moving. As a result, it is determined that the "distance between two points" is reduced.

Therefore, when a user intends to perform a multi-drag operation, a pinch-out and a pinch-in are notified alternately based on the above-described determination results. As a result, an unnatural display, in which the displayed image is enlarged and reduced alternately, is performed on the apparatus against the user's intention.

On the contrary, in the present exemplary embodiment, position information of a plurality of touched points configuring a multi-touch operation is obtained and, in response to a completion of an update of the position information of all obtained touched points, an operation content performed by the user is determined.

Figure 1A:
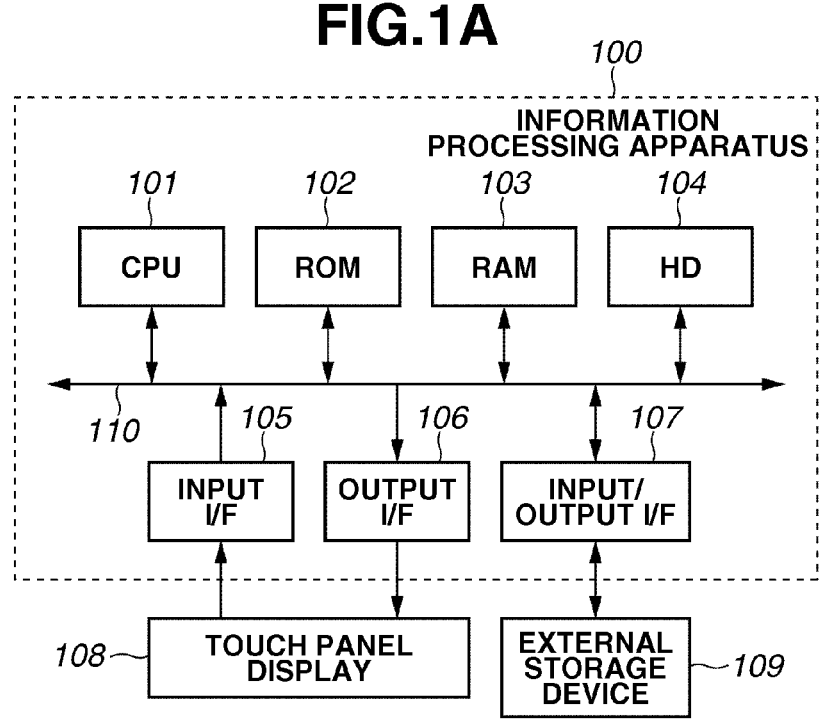
FIG. 1A is a block diagram illustrating an example hardware configuration of an information processing apparatus.

FIG. 1A is a diagram illustrating an example hardware configuration of an information processing apparatus 100 according to the present exemplary embodiment. A central processing unit (CPU) 101 performs calculations and logical determinations for various kinds of processing and controls each component connected to a system bus 110.

The information processing apparatus 100 is provided with memories including a program memory and a data memory. A read only memory (ROM) 102 is a program memory to store programs for controlling various kinds of processing procedures by the CPU 101 described below. A random access memory (RAM) 103 includes a work area for the above-described programs for the CPU 101, a save area of data for error processing, and a load area for the above-described control program. The program memory may be realized by loading programs from an external storage device 109 to the RAM 103.

A hard disk (HD) 104 stores data and programs according to the present exemplary embodiment. In the present exemplary embodiment, the HD 104 stores a plurality of image data. The external storage device 109 connected thereto via an input/output interface (I/F) 107 may be used in place of the HD 104.

The external storage device 109 may be configured with, for example, a medium (recording medium) and an external storage drive for accessing to the medium. Such a medium includes, for example, a flexible disc (FD), a compact disc ROM, a digital versatile disc (DVD), a universal serial bus memory, a magneto optic disc, and a flash memory.

Further, the external storage device 109 may be a server apparatus connected via a network. In the present exemplary embodiment, necessary information is stored in the RAM 103, the HD 104, and the external storage device 109.

An input interface (I/F) 105 controls an input device such as a pointing device to obtain a signal output from the input device. An output I/F 106 outputs a control signal for controlling an output of a result of various kinds of processing described below to an output device including a display unit such as a liquid crystal display and a television monitor.

In the present exemplary embodiment, a touch panel display 108 integrated in the information processing apparatus 100 includes a touch panel (input device) and a display device (output device). However, an external device connected to the information processing apparatus 100 may be used and also independent devices may be used.

From the touch panel as the input device according to the present exemplary embodiment, a signal indicating the detection of the point touched or detached by a user is notified to the information processing apparatus 100 as a touch event. At that time, the input I/F 105 acquires a touch event one by one detected sequentially by scanning a touch detection area.

In the present exemplary embodiment, a capacitance detection type touch panel is used, and coordinates of a point are specified as a touched point in a contact area between the user and the panel surface to notify the touch event. However, the touch panel type is not limited to the capacitance detection type.

Figure 1B:
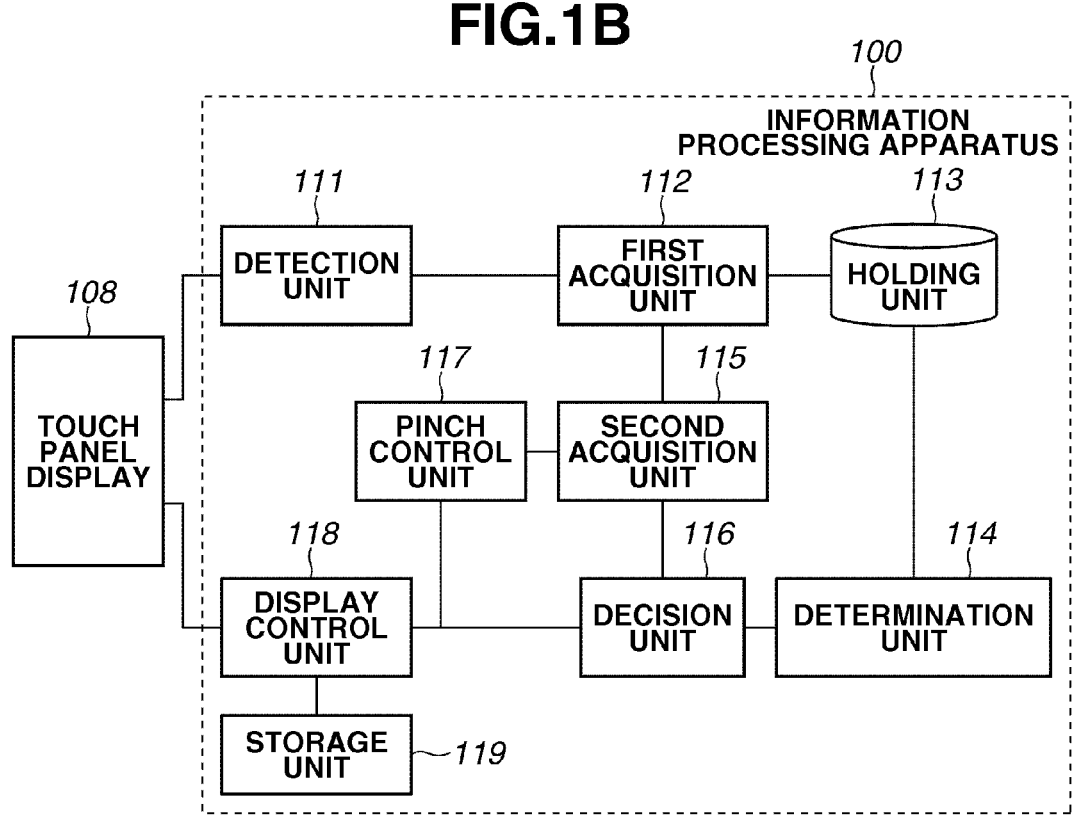
FIG. 1B is a block diagram illustrating an example function configuration of the information processing apparatus.

FIG. 1B is a function block diagram illustrating a function configuration of the information processing apparatus 100 according to the present exemplary embodiment. The information processing apparatus 100 includes a detection unit 111, a first acquisition unit 112, a determination unit 114, a second acquisition unit 115, a decision unit 116, and a display control unit 118.

These function units are implemented by the CPU 101 loading and executing the program stored in the ROM 102 in the RAM 103. Further, in the present exemplary embodiment, a holding unit 113 is configured by the RAM 103, and a storage unit 119 is a function unit of the HD 104. Hereinbelow, each component will be described.

The detection unit 111 sequentially detects information of a touch event notified from the touch panel display 108 one by one and analyzed it.

The first acquisition unit 112 acquires information about the touched points detected by the detection unit 111. Then, information indicating the position of a touched point and the time when the touch is detected (detection time) are associated with an ID of the touched point, and then stored in the holding unit 113 for each touched point. Using the ID, the same touched point can be identified.

Therefore, the first acquisition unit 112 updates the information held by the holding unit 113 each time the first acquisition unit 112 acquires the information of the touched point with the same ID. By associating the order of detecting the touched points with the IDs, the management becomes easier when a plurality of touched points is detected.

The determination unit 114 refers to the information held in the holding unit 113, to determine whether the position information of all the detected touched points has been updated.

The second acquisition unit 115, based on the information acquired by the first acquisition unit 112, calculates the distance between two touched points and the changed amount of distance therebetween before and after the positions of the touched points are updated, and the absolute value thereof.

Specifically, the second acquisition unit 115 calculates a shortest distance based on the coordinates of the two touched points acquired by the first acquisition unit 112, and holds it. Then, the second acquisition unit 115 performs a comparison operation between the distance of the two points newly calculated after the update of the touched points and the held distance to obtain the changed amount of the distance and the absolute value thereof.

The decision unit 116 acquires the absolute value of the changed amount of the distance between the two points obtained by the second acquisition unit 115 to compare thereof with a predetermined threshold value. In the present exemplary embodiment, if the obtained changed amount is equal to or larger than the predetermined threshold value, the decision unit 116 decides that the operation performed by the user is a pinch operation (first operation). On the other hand, if the acquired changed amount is smaller than the predetermined threshold value, the decision unit 116 decides that the operation performed by the user is a multi-drag operation (second operation).

If the decision unit 116 decides that a pinch operation is input, a pinch control unit 117 determines whether a pinch-out or pinch-in operation is started, based on the changed amount acquired by the second acquisition unit 115.

The display control unit 118 acquires the information processed by the decision unit 116, and generates a display image for displaying on an output device, which is a touch panel display in the present exemplary embodiment. On the display, before the multi-touch operation is performed by the user, at least one of a plurality of image data stored in the storage unit 119 is displayed.

If the decision unit 116 decides that the input operation is a pinch operation, the decision unit 116 acquires a parameter from the pinch control unit 117, and generates a display image, which is produced by enlarging or reducing the displayed image before the user performs operation. On the other hand, if the decision unit 116 decides that the input operation is a multi-drag operation, in the present exemplary embodiment, based on the direction in which the touched points are moved, the decision unit 116 generates a display image for displaying a specific image among the plurality of image data stored in the storage unit 119.

FIG. 2 is a flowchart illustrating a flow for recognizing a multi-touch operation by the information processing apparatus 100 according to the present exemplary embodiment.

The information processing apparatus 100 according to the present exemplary embodiment starts the processing for recognizing the multi-touch operation in response to the display of at least one of the image data stored in the storage unit 119 on the touch panel display 108.

First, in step S201, a touched point is acquired. In the present exemplary embodiment, the detection unit 111 acquires a touch event one by one by detected by scanning the input area 401 of the touch panel and analyzes it.

Then, the first acquisition unit 112 holds in the holding unit 113 the information about the touched point detected on the input area 401 for each touched point. In the present exemplary embodiment, the ID of the touched point, the information indicating the position information expressed by coordinates, and the acquired time are held in the holding unit 113. The details of the processing performed in step 201 will be described below.

In step S202, the determination unit 114 determines whether a plurality of the touched points is detected in the input area 401. In the present exemplary embodiment, since each touched point is identified by the ID, the number of touched points is obtained by referring to the number of IDs among pieces of information stored in the holding unit 113.

In the present exemplary embodiment, the information processing apparatus 100 determines whether a multi-touch operation required by using two touched points is a multi-drag of a pinch operation. Therefore, the description will be made below assuming that, in the input area 401, up to two touched points are detected.

If it is determined that two or more touched points is detected (YES in step S202), the processing proceeds to step S203. On the other hand, if it is determined that two or more touched points is not detected (NO in step S202), the processing ends.

In step S203, the determination unit 114 determines whether the position information of all the touched points whose information is held in the holding unit 113 is updated. In the present exemplary embodiment, in step S201, the first acquisition unit 112 sets an update flag when the information of the touched point is updated, and in step S203, the determination unit 114 performs determination based on the number of update flags.

The result of the first processing in step S203 is always determined as "YES". If the position information of all the touched points is determined to be updated (YES in step S203), the update flag is reset and the processing proceeds to step S204. If the position information of all the touched points is determined not to be updated (NO in step S203), the processing ends.

In addition, the method for determining whether the touched points are updated is not limited thereto, and other methods can be used. For example, the determination unit 114 may refer to the detection time of each touched point held in the holding unit 113, and perform determination based on whether the information of all the touched points, which are detected after the time when the processing in step S203 is determined to be "YES" last time, is updated.

As described above, in the present exemplary embodiment, the latest position information of all the touched points is specified by the fact that the position information of all the held touched points being updated.

In step S204, the decision unit 116 decides whether at least one touched point is moved. In the present exemplary embodiment, in step S201, when new position information of a touched point having the same ID as an already detected ID is obtained, a movement flag is set and held in the holding unit 113.

Therefore, in step S204, the decision unit 116 can decide whether the touched point is moved by checking the movement flag in the holding unit 113. If it is determined that at least one touched point is moved (YES in step S204), the movement flag is reset and the processing proceeds to step S206. If it is determined that no touched point is moved (NO in step S204), the processing proceeds to step S205.

In addition, the method for deciding whether a touched point is moved is not limited thereto. For example, the position information before the update is held when the information of the holding unit 113 is updated and the decision unit 116 may decide whether the touched point is moved based on whether the distance between the position information before and that after the update is larger than a predetermined distance.

In step S205, the second acquisition unit 115 acquires the distance between touched two points. The second acquisition unit 115 calculates the shortest distance between the two touched points based on the information acquired by the first acquisition unit 112, and holds it.

On the other hand, in step S206, the second acquisition unit 115 acquires changed amount of the distance between two touched points detected in the input area 401. The second acquisition unit 115 calculates the shortest distance between two touched points based on the information acquired by the first acquisition unit 112 and holds it.

Then, the newly calculated distance between two points after the update and the distance between two points calculated and held last time in step S205 or step S206 are subjected to a comparison calculation to obtain the changed amount and the absolute value of the distance.

Then, in step S207, the decision unit 116 decides whether the absolute value of the changed amount of the distance between the two points acquired by the second acquisition unit 115 is smaller than a threshold value "a".

Herein, "a" is a threshold value for the distance registered in advance in the information processing apparatus 100. The threshold value "a" is set based on the changed amount of the distance between two points required to be recognize by the information processing apparatus 100 that the distance of the two points touched by a user is widened for the pinch operation or narrowed.

If it is determined that the changed amount (absolute value) is smaller than the threshold value "a" (YES in step S207), the decision unit 116 decides that the operation input by the user is a multi-drag operation, and the processing proceeds to step S208. If it is determined that the changed amount (absolute value) is equal to or larger than the threshold value "a" (NO in step S207), the decision unit 116 decides that the operation input by the user is a pinch operation, and the processing proceeds to step S210.

In step S208, the decision unit 116 notifies to the display control unit 118 that the multi-drag operation is input. In step S209, processing corresponding to the multi-drag operation is performed. In the present exemplary embodiment, the processing to display on the touch panel display specific image data among a plurality of data stored in the storage unit 119 is performed. Details thereof are described below.

On the other hand, in step S210, the pinch control unit 117 determines whether the input pinch-out operation or pinch-in operation is started. In the present exemplary embodiment, the pinch control unit 117 determines whether the distance between the touched two points is widened or narrowed based on the changed amount between the two points acquired by the second acquisition unit 115.

Then, the number of the distance between two points being widened or narrowed is counted. In step S210, if the number of continuously counted times that the distance between the touched two points is widened is two times or more, it is determined that the pinch-out operation is started.

If the number of continuously counted times that the distance between the touched two points is narrowed is two times or more, it is determined that the pinch-in operation is started. On the other hand, if the number of continuously counted times that the distance between the touched two points is widened or narrowed is once, whether it is a pinch-out or pinch-in operation is not determined. In this case, it is determined that the pinch operation is not started.

This processing is performed to prevent false operations even when an error occurs in which it is erroneously determined, in step S207, that the changed amount of the distance of the two points (absolute value) is the threshold value "a" or larger caused by states of the touch panel and the user's fingers. Thus, the intention of the user to perform a pinch operation is surely reflected.

If it is determined that a pinch-out or pinch-in operation is started (YES in step S210), the processing proceeds to step S211. On the other hand, if it is determined that neither the pinch-out operation nor the pinch-in operation is performed (NO in step S210), the processing ends.

In step S211, the pinch control unit 117 notifies to the display control unit 118 that a pinch-out or pinch-in operation is input. In step S212, the display control unit 118 outputs a result caused by the input of the pinch-out or pinch-in operation.

In the present exemplary embodiment, when the pinch-out operation is input, processing for displaying the enlarged display image on the display according to the distance that the user moves the touched points, is performed. Further, when the pinch-in operation is input, processing for displaying the reduced display image on the display according to the distance that the user moves the touched points, is performed.

As described above, the processing for recognizing the multi-touch operation by the information processing apparatus 100 is performed. After the series of processing is completed, the processing returns to step S201, and each time a new touch event is notified, the above-described processing is performed.

Figure 3A:
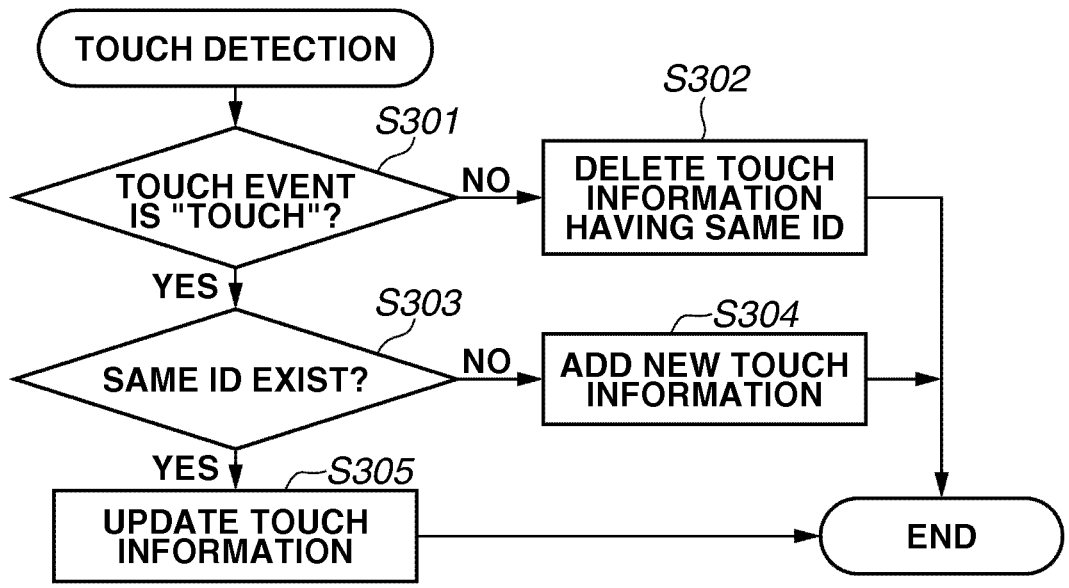
FIG. 3A is a flowchart illustrating an example touch detection processing performed by the information processing apparatus.

FIG. 3A is a flowchart illustrating a flow of touched point detection processing performed in step S201.

In step S301, the detection unit 111 determines whether the touch event notified from the touch panel is "TOUCH".

From the touch panel used in the present exemplary embodiment, "TOUCH" is output as a touch event when the input area 401 is scanned to detect that it is touched. When the detected touch is released, "RELEASE" is notified as a touch event.

If the notified touch event is determined to be "TOUCH" (YES in step S301), the processing proceeds to step S303. If the notified touch event is not "TOUCH" (i.e., "RELEASE") (NO in step S301), the processing proceeds to step S302.

In step S302, the first acquisition unit 112 deletes the information associated with the ID corresponding to the touched point at which "RELEASE" is detected among the information held in the holding unit 113, together with the ID.

On the other hand, in step S303, the detection unit 111 determines whether the touched point with the same ID as the touched point at which "TOUCH" is detected has been already detected. The detection unit 111 refers to the information held in the holding unit 113 and determines whether corresponding ID is included.

If it is determined that a touched point with the same ID has been already detected (YES in step S303), the processing proceeds to step S305. On the other hand, if it is determined that a touched point with the same ID has not been detected (NO in step S303), the processing proceeds to step S304.

In step S304, the first acquisition unit 112 newly adds the information such as the ID of the touched point at which "TOUCH" is detected, the coordinates, and the time to the information held in the holding unit 113. At that time, the holding unit 113 holds the information indicating that the touched point is updated. For example, an update flag is set.

In step S305, the information of the coordinates with the same ID as the touched point where "TOUCH" is detected and the detected time from among the information held in the holding unit 113, is updated. At that time, the holding unit 113 holds the information indicating that the touched point is updated. For example, an update flag is set.

Further, when the acquired position information is moved from the position of the touched point with the same ID before update by a predetermined distance or more, the information indicating that the touched point is moved, is held. For example, a movement flag is set.

Then, the processing returns to the main processing (FIG. 2) in which the multi-touch operation is recognized. In the present exemplary embodiment, the predetermined distance is set in advance based on the shortest distance by which the touched point needs to be moved to perform a touch operation by the user.

To discriminate a plurality of operations, a plurality of stepwise threshold values may be set. In the present exemplary embodiment, when a movement within the predetermined distance is detected, the touched point is treated as not moved, i.e., stopped.

In the present exemplary embodiment, a touch panel that notifies "TOUCH" as a touch event when the input area 401 is scanned and the touch is detected, and notifies "RELEASE" as a touch event when the detected touched point is released. However, it is not limited thereto.

For example, "TOUCH_DOWN", "MOVE", and "TOUCH_UP" are notified as touch events respectively when the input area 401 is newly touched, when the movement of the touched point with the already detected ID is detected, and when the touched point is released.

In this case, when "TOUCH_DOWN" is notified, information held in the holding unit 113 is newly added and the update flag is set. When "MOVE" is notified, the information with the same ID is updated and the movement flag is set. Further, the "TOUCH_UP" is notified, the information with the same ID may be deleted.

In this way, the information processing apparatus 100 identifies two or more touched points detected by the touch panel that is an input device using IDs and manages the information. As a result, the movement of each of the plurality of touched points can be detected. Therefore, the multi-touch operation configured at those touched points can be recognized.

Figure 3B:
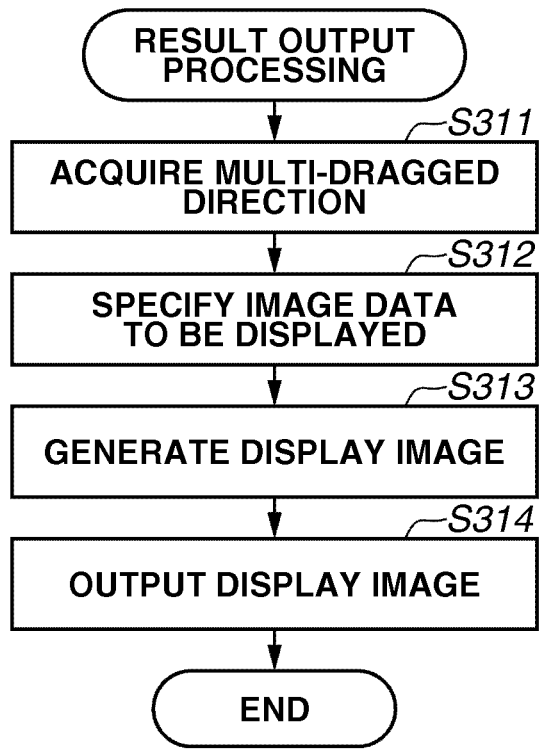
FIG. 3B is a flowchart illustrating an example of output processing performed by the information processing apparatus.

FIG. 3B is a flowchart illustrating a flow of a result output processing of the multi-drag operation performed in step S209. An example operation required by the multi-drag operation, in the present exemplary embodiment, processing for displaying a specific image data on the touch panel display from among a plurality of image data stored in the storage unit 119, is performed. The plurality of image data stored in the storage unit 119 is stored in a predetermined order.

In the present exemplary embodiment, if the multi-dragged direction is left, an image stored ten sheets after the image data displayed before the operation of the user. If the multi-dragged direction is right, an image stored ten sheets before the image data displayed before the operation of the user.

In step S311, the display control unit 118 acquires the multi-dragged direction performed by the user. In the present exemplary embodiment, the display control unit 118 acquires for at least one of the touched points acquired by the first acquisition unit 112 whether the direction to which the user moves the user's finger from the X-coordinate of the position information before and after the update is minus direction or plus direction of the X-axis.

In step S312, the display control unit 118 specifies image data to be displayed on the display based on the information indicating the direction acquired in step S311. In the present exemplary embodiment, if the acquired direction is the minus direction of the X-axis, from among a plurality of image data stored in the storage unit 119, image data corresponding to the image data ten sheets after the image data displayed before the user's operation, is specified.

Similarly, if the acquired direction is the plus direction of the X-axis, from among a plurality of image data stored in the storage unit 119, image data corresponding to the image data ten sheets before the image data displayed before the user's operation, is specified.

In step S313, the display control unit 118 generates a display image for displaying the specified image data. Then, in step S314, the display control unit 118 outputs the generated display image to the touch panel display 108 (output device). Then the processing is ended to return to the main processing (i.e., flowchart in FIG. 2) for recognizing the multi-touch operation.

In addition, when the output of the display image in step S314 is performed, the processing may be performed in response to the release of the touched point by the user. In that case, after step S313, the touched point detection processing in FIG. 3A is performed and the processing proceeds to step S314 based on the completion of the delete processing of the information of the touched points in step S302 from the holding unit 113 for all the touched points.

In this way, the user can designate a timing to display a specific image to the information processing apparatus 100 by the operation of releasing the fingers used for inputting the multi-drag operation from the touch panel.

The operation requested by the multi-drag operation is not limited to the example described above. For example, the method for specifying the image data to be displayed is not limited to ten sheets after or ten sheets before, and can be set arbitrarily set. Further, with respect to the multi-drag operation in the Y-axis direction, a certain operation of the information processing apparatus 100 can be assigned.

However, in general, image advancing is carried out in many cases corresponding to the operation for moving the displayed image in the X direction by the drag, to display other images stored before and after the image. Therefore, the operation for displaying a specific image by advancing more images at once by moving images displayed in the X-axis direction using a multi-drag with a plurality of fingers, is understandable intuitively and convenient to the users.

An operation example 1 of the information processing apparatus 100 according to the first exemplary embodiment by a user is described in detail.

Figure 4A:
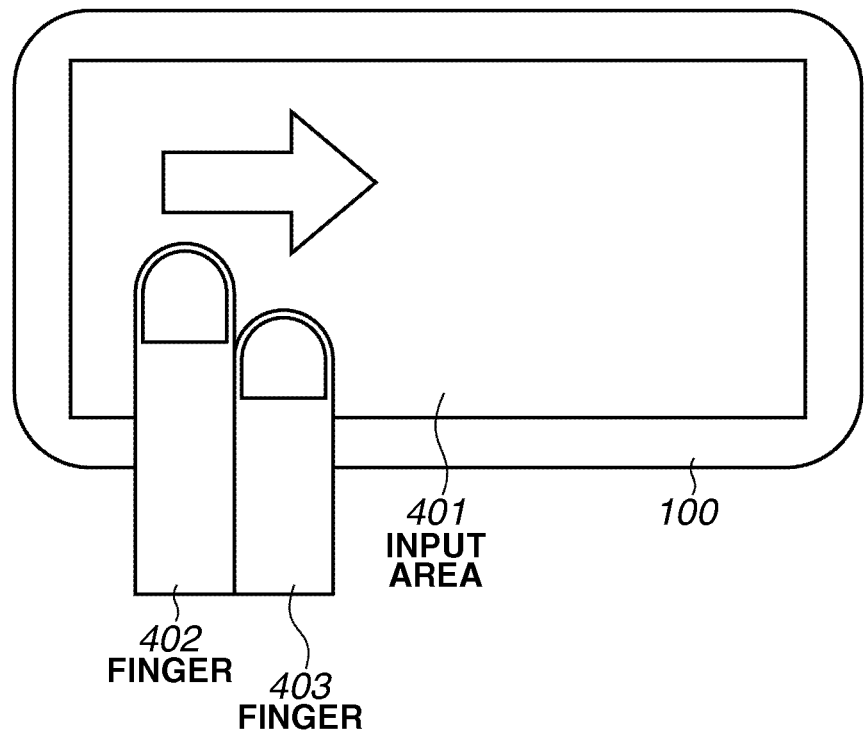
FIG. 4A is a diagram illustrating an example multi-drag operation performed by a user.

FIG. 4A is a diagram illustrating an example operation of the information processing apparatus 100 according to the present exemplary embodiment. FIG. 4A illustrates a state where a user inputs an operation in an input area 401 of the information processing apparatus 100. The input area 401 is configured of a touch panel display including a touch panel on the display. The input area 401 can detect a touch by a user on the touch panel.

In the present exemplary embodiment, the entire input area 401 is used as a coordinate plane with an origin point at a lower left position thereof, and the touch panel detects coordinates of the position touched by the user. In the present exemplary embodiment, as a specific operation example, the multi-drag operation is input by contacting fingers 402 and 403 to the input area 401 and moving fingers 402 and 403 in the horizontal direction.

Figure 4B:
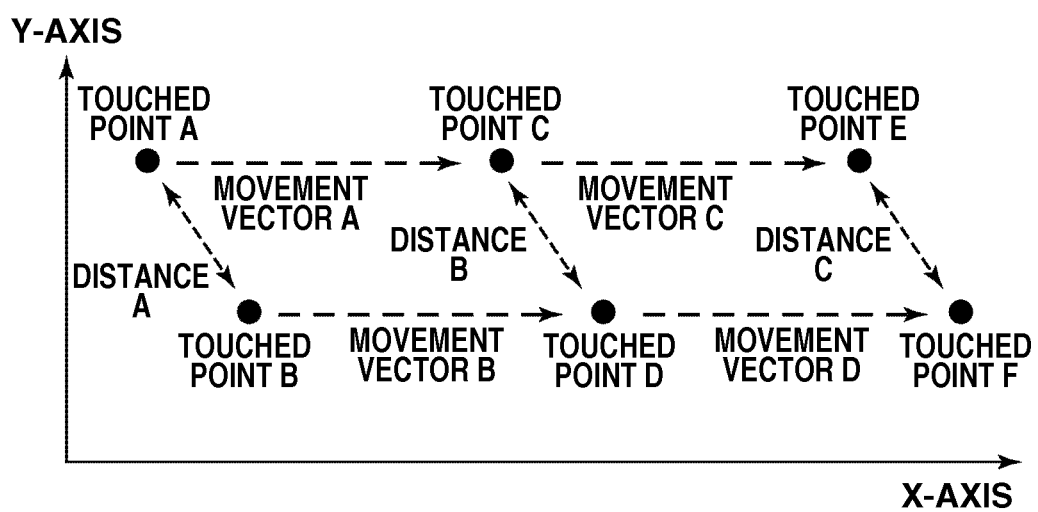
FIG. 4B is a diagram illustrating an example distribution of touched points detected when a user performs a multi-drag operation.

FIG. 4B is a diagram illustrating an example shift of the positions of the touched points obtained by the information processing apparatus 100 when the user performs the multi-drag operation as illustrated in FIG. 4A. The touched points A to F illustrate coordinates of positions touched by the user's fingers in the input area 401. The horizontal direction is set to be the X-axis and the vertical direction is set to be the Y-axis.

First, the user's fingers 402 and 403 touch the positions corresponding to the points A and B in the input area 401. The left side finger 402 touches the position corresponding to the touched point A, and the right side finger 403 touches the position corresponding to the touched point B.

Then, the user moves the two fingers horizontally. The touched positions after moving the two fingers correspond to the touched point C and the touched point D. The left side finger 402 touches the position corresponding to the touched point C, and the right side finger 403 touches the position corresponding to the touched point D.

Further, the user moves the two fingers horizontally. Touched positions after moving the two fingers are touched points E and F. The left side finger 402 touches the position corresponding to the touched point E, and the right side finger 403 touches the position corresponding to the touched point F. Hereinbelow, according to the series of operations, the operation of the information processing apparatus 100 according to the present exemplary embodiment will be described.

In the operation example 1, the input area 401 of the touch panel is scanned every 20 ms, and sequentially detected touch events are notifies to the detection unit 111. In addition, the threshold value "a" is set to be 10 dots in advance.

First, the scanning of the input area 401 is started in a state where the user touches the input area 401, and the touch event of the touched point A is notified from the touch panel. In step S201, the detection unit 111 of the information processing apparatus 100 detects that the touched point A is newly touched. Then, the first acquisition unit 112 acquires information that the ID is 1, the position coordinates are (100, 50), and the detection time is 0 ms, to hold them in the holding unit 113.

FIG. 5A is a table illustrating an example of information held in the holding unit 113. In step S202, the determination unit 114 refers to the information held in the holding unit 113 to determine whether two or more touched points are detected in the input area 401 based on the number of IDs. At this time point, as illustrated in FIG. 5A, only a touched point with ID 1 is detected, and not two or more touched points (NO in step S202), and therefore the processing ends.

Next, from the touch panel, the touch event of the touched point B is notified. In the information processing apparatus 100, in step S201, similarly, the first acquisition unit 112 acquires information that the ID is 2, the position coordinates are (110,40), and the detection time is 5 ms. At that time, the table held in the holding unit 113 is updated as illustrated in FIG. 5B.

In step S202, the determination unit 114 determines that the number of touched points are two or more (YES in step S202). In step S203, the determination unit 114 determines that the information of all the detected touched points is updated (YES in step S203), because the processing is performed for the first time. In step S204, the decision unit 116 decides that at least one touched point is not moved (NO in step S204). Then, in step S205, the distance B in FIG. 4B is calculated based on position coordinates of respective two touched points. The distance B is shortest among other distances between respective two points.

In the present exemplary embodiment, based on the coordinates of the touched point A (100, 50) and of the touched point B (110, 40), the distance between the two points is 14 dots. The second acquisition unit 115 holds 14 dots in the RAM 103 as the distance between the two points at the detection start time. Then, the processing is terminated.

Next, the input area 401 is scanned at each 20 ms, the touch event of the touched point C is notified from the touch panel. In step S201, the first acquisition unit 112 of the information processing apparatus 100 acquires the information that the ID is 1, the position coordinates are (200, 50), and the detection time is 20 ms, and the information held in the holding unit 113 is updated as illustrated in FIG. 5C. At that time, the ID of the touched point C is 1, i.e., identical to that of the touched point A, and therefore the information associated to that of the ID 1 is updated.

Further, the position coordinates are different from those detected last time, a movement flag is set. In step S202, the number of touched points is determined to be two or more. In step S203, since the information of the touched point with the ID 1 is updated but the touched point with the ID 2 is not updated, the determination unit 114 determines that the information of not all the touched points is updated (NO in step S203), the processing is terminated.

Next, a touch event of the touched point D is notified from the touch panel. In step S201, the information processing apparatus 100 similarly acquires information that the ID is 2, the position coordinates are (210, 40), the detection time is 25 ms and the information held in the holding unit 113 is updated as illustrated in FIG. 5D. At that time, since the ID of the touched point D is 2 and identical to that of the touched point B, the information associated to ID 2 is updated.

Further, since the position coordinates are different from those at the last detection time, the movement flag is set. In step S202, the number of touched points is determined to be two, i.e., two or more (YES in step S202). Therefore, in step S203, since the touched points with the ID 1 and ID 2 has been updated, it is determined that position information of all the touched points are updated (YES in step S203). In step S204, based on the movement flag, it is determined that at least one touched point is moved (YES in step S204).

In step S206, the second acquisition unit 115 acquires the changed amount of the distance between the touched two points and the absolute value thereof. First, based on the coordinates of the touched point C (200, 50) and the coordinates of the touched point D (210, 40), the distance between the two points (distance B in FIG. 4A) is calculated as 14 dots.

Then, the changed amount (absolute value) from the distance between the two points acquired by second acquisition unit 115 last time and held in the RAM 113, is calculated to be 0 dot (=14−14).

Now, since the threshold value "a" is 10 dots, in step S207, the decision unit 116 decides that the changed amount of the distance between the two points is smaller than the threshold value "a" (YES in step S207). Therefore, in step S208, the multi-drag operation is notified, and in step S209, an output is performed.

According to the operation example 1, the multi-drag operation is performed in the plus direction of the X-axis, from among the plurality of image data stored in the storage unit 119, image data corresponding to the image ten sheets before the image displayed before the user's operation, is displayed.

Further, since the input area 401 is scanned every 20 ms, a touch event of the touched point E is notified from the touch panel.

In step S201, the first acquisition unit 112 of the information processing apparatus 100 acquires the information that the ID is 1, the position coordinates are (300, 50), and the detection time is 40 ms, and the information held in the holding unit 113 is updated as illustrated in FIG. 5E. At that time, the ID of the touched point E is 1, i.e., identical to that of the touched point C, and therefore the information associated to that of the ID 1 is updated.

Further, the position is moved. In step S202, it is determined that the number of the touched points is two or more. In step S203, since the information of the touched point with the ID 1 is updated but the touched point with the ID 2 is not updated, the determination unit 114 determines that the information of not all the touched points is updated (NO in step S203), and the processing is terminated.

Next, from the touch panel, a touch event of the touched point F is notified. In step S201, the first acquisition unit 112 of the information processing apparatus 100 similarly acquires information that the ID is 2, the position coordinates are (310, 40), and the detection time is 45 ms, and the information held in the holding unit 113 is updated as illustrated in FIG. 5F. At that time, the ID of the touched point F is 2, i.e., identical to that of the touched point D, and therefore the information associated to that of the ID 2 is updated.

Further, the position coordinates are different from those detected last time, the movement flag is set. In step S202, the number of touched points is determined to be two, i.e., two or more (YES in step S202). Therefore, in step S203, since the touched points with the ID 1 and ID 2 are updated, it is determined that the position information of all the touched points is updated (YES in step S203). In step S204, it is determined that at least one touched point is moved (YES in step S204).

In step S206, the second acquisition unit 115 acquires the changed amount of the distance between the touched two points and the absolute value thereof. First, based on the coordinates of the touched point E (300, 50) and the coordinates of the touched point F (310, 40), the distance between the two points (distance F in FIG. 4B) is calculated to be 14 dots. Then, the changed amount (absolute value) from the distance between the two points acquired by second acquisition unit 115 last time and held in the RAM 113, is calculated to be 0 dot (=14−14).

Now, since the threshold value "a" is 10 dots, in step S207, the decision unit 116 decides that the changed amount of the distance between the two points is smaller than the threshold value "a" (YES in step S207). Therefore, in step S208, the multi-drag operation is notified, and in step S209, an output is performed.

According to the operation example 1, the multi-drag operation is performed in the plus direction of the X-axis, from among the plurality of image data stored in the storage unit 119, image data corresponding to the image ten sheets further before the image displayed in step S209, is displayed.

When image data specified in response to the release of the touched point is displayed, even if the multi-drag operation is notified more than once, the display image for displaying the image data specified for the first time is maintained.

Therefore, in response to the release of all the touches of the touched points by the user, the image data corresponding to the image ten sheets before the image displayed before the user's operation. In this way, the user can certainly display the image data corresponding to the image ten sheets before or after the image displayed, regardless of distance of the multi-drag operation.

As described above, in the present exemplary embodiment, the position information of the two touched points touched by the user is acquired, and in response to the completion of the update of the position information of all the two touched points, the processing to determine the multi-touch operation input by the user to the information processing apparatus 100 is performed.

At that time, by comparing the changed amount of the distance between the two points and the threshold value, it is determined that the input operation is whether the multi-drag operation or the pinch operation. In this way, when the user moves the two touched points in the same direction while keeping the distance between the touched two points, the pinch operation is not erroneously notified. As a result, the false operation in which the size of the display image is changed against the user's intention is prevented.

Similarly, when the user inputs another multi-touch operation using a plurality of fingers such as a scroll or rotation of the image, by applying the present exemplary embodiment thereto, it is possible to prevent the pinch operation from being recognized erroneously.

In this case, by determining the multi-touch operation input by the user after the position information of all the touched points constituting the multi-touch operation is updated, it is possible to reduce the false operations performed against the user's intention.

In the present exemplary embodiment, after the decision unit 116 decides that the operation input by the user is a pinch operation, in step S210, the pinch control unit 117 determines whether the pinch-out operation or pinch-in operation has started. The processing performed in step S210 may be omitted.

In that case, in step S211, the decision unit 116 notifies to the display control unit 118 that the pinch operation has been input. Then, in step S212, the display control unit 118 performs processing to change the size of the displayed image according to the distance of which the user moves the touched point based on the changed amount between the two points acquired by the second acquisition unit 115.

However, in step S210, by determining whether the operation has started based on the changed directions and the number of the changed directions of the distance between the two points, the display image can be changed after determining the operation intended by the user more correctly.

For example, if an error occurs in that the changed amount (absolute value) of the distance between the two points is determined to be the threshold value "a" or larger caused by the state of the touch panel or the user's fingers, the notification that the pinch operation is input is not performed. Accordingly, an effect to prevent the false operation in which the display magnification of the displayed image is changed against the user's intention can be obtained.

In the present exemplary embodiment, the processing of the two touched points is described, but even if the touched points of more than two points are detected, similar processing can be performed.

In this case, for example, only two touched points selected according to the detected order starting from the first touched point, and the same processing described above is performed. Alternately, if N touched points (more than two points) of the touched point are detected, information of all the N touched points is acquired, and in step S203, the subsequent processing steps are performed in response to the completion of the update of the information of all the N touched points.

In the first exemplary embodiment, the touch panel as an input device notifies to the information processing apparatus 100 a touch event each time the touch panel detects a touched point or a released touched point by a user. In comparison, in a modification example 1, the touch panel notifies a touch event each time the touch panel detects a touched point at a new position by the user and touched point released by the user to the information processing apparatus 100. Such a case will be described below.

The touch panel used in the modification example 1 of the first exemplary embodiment does not notify a touch event when the touched point is stationary. Therefore, information of the touched point held by the information processing apparatus 100 is not overwritten.

Accordingly, when the processing to recognize a multi-touch operation according to the first exemplary embodiment is performed, and for example, in a case where the user fixes one touched point of the two touched points and moves another touched point to perform a pinch operation, a part of the information of the touched points is held as it is.

Therefore, if the determination is performed based on the completion of the update of all the information held by the information processing apparatus 100 as in the first exemplary embodiment, the multi-touch operation may not be performed. Accordingly, in the modification example 1 of the first exemplary embodiment, it is determined that the information of all the touched points are specified based on the elapse of a predetermined time from the earliest detection time held in the holding unit 113.

The hardware configuration and function configuration of the information processing apparatus 100 according to the modification example 1 are the same as those of the first exemplary embodiment. However, the determination unit 114 of the modification example 1 of the first exemplary embodiment refers to a clock included in the information processing apparatus 100 and the information held in the holding unit 113, and determines that the position information of all the touched points has been updated according to the elapse of the predetermined time since the earliest update was performed.

Figure 6:
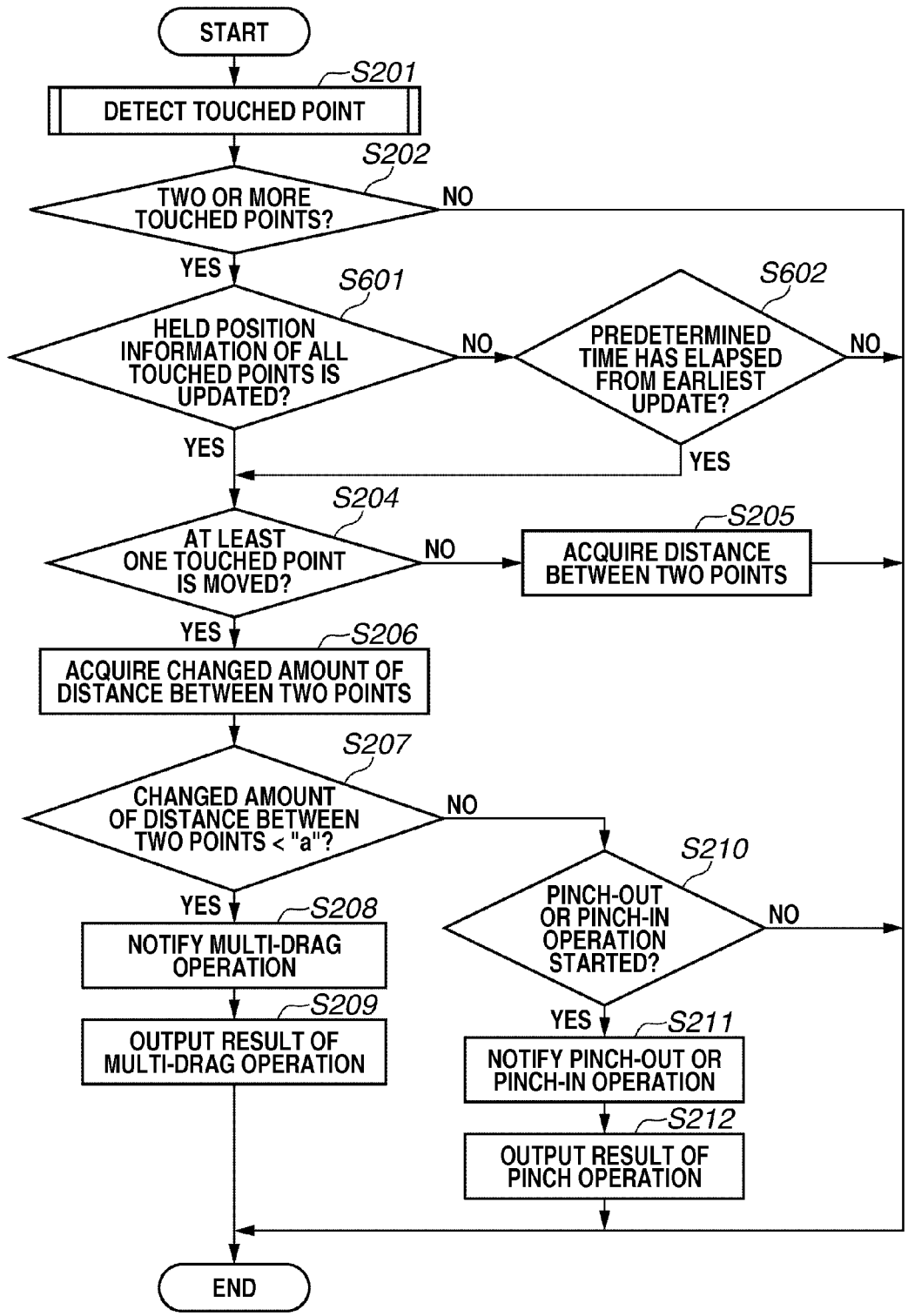
FIG. 6 is a flowchart illustrating a flow for recognizing a multi-touch operation by the information processing apparatus.

FIG. 6 is a flowchart illustrating a processing flow, which is performed by the information processing apparatus 100 in the modification example 1 of the first exemplary embodiment, for recognizing the multi-touch operation. In the steps with the same numerals as those in FIG. 2, the same processing is performed. Therefore, details thereof are not described and the different portions from the first exemplary embodiment will be described.

In the modification example 1 of the first exemplary embodiment, in step S202, if it is determined that there is two or more touched points (YES in step S202), then, in step S601, the determination unit 114 determines whether the position information of all the touched points held in the holding unit 113 is updated. In the processing of the first time, it is always determined to be "YES".

Then, if it is determined that all the position information held by the holding unit 113 is updated (YES in step S601), the processing proceeds to step S204. On the other hand, if it is determined that all the position information held by the holding unit 113 is not updated (NO in step S601), the processing proceeds to step S602.

In step S602, the determination unit 114 determines whether a predetermined time has elapsed since the completion of the update of the earliest touched point among the touched points detected at present. Herein, the predetermined time is set in advance to be a time long enough to complete the scanning of the entire input area 401 by the touch panel.

For example, a time as long as the period of the scanning of the touch panel is set. If the detected touched points are two or more, and a time enough to complete the update of scanning of the entire touch panel has elapsed since the earliest position information among the currently detected position information, it is known that the movement of the touched point, of which touch event is not notified, is not detected. Therefore, it is considered that the position information of all the touched points held in the holding unit 113 at the time point is maintained.

If the determination unit 114 determines that the predetermined time has elapsed since the earliest update of the position information of the touched points was performed (YES in step S602), the processing proceeds to step S204. On the other hand, if the determination unit 114 determines that the predetermined time has not elapsed since the earliest update of the position information of the touched points was performed (NO in step S602), the processing is terminated.

The processing other than those described above is performed similar to the processing to recognize the multi-touch operation by the information processing apparatus 100 illustrated in FIG. 2.

The operation example 2 of the information processing apparatus 100 according to the modification example 1 of the first exemplary embodiment operated by the user is described in detail referring to FIGS. 7A to 7E.

Figures 7A, 7B, 7C, 7D, 7E:
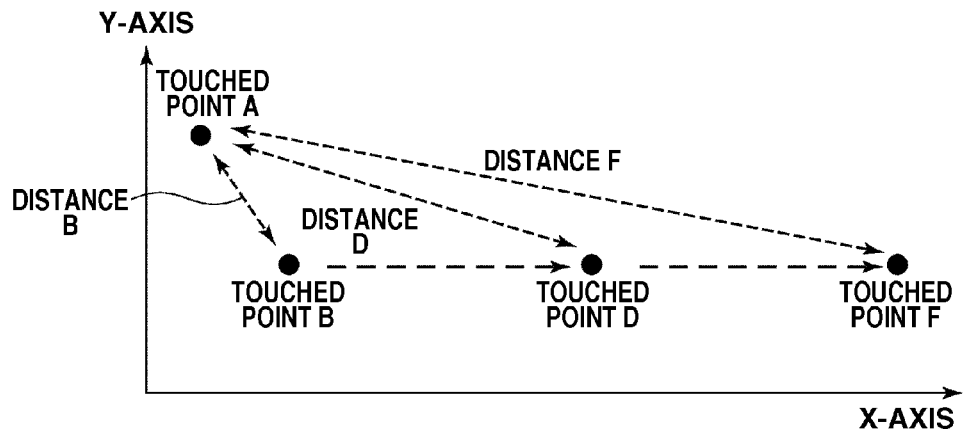
FIG. 7A is a diagram illustrating an example distribution of touched points detected when a user performs a pinch operation.
FIGS. 7B to 7E are tables illustrating examples of information held for detected touched points.

FIG. 7A is a diagram illustrating an example of position shifts of the touched points acquired by the information processing apparatus 100 when the user performs a pinch operation. FIG. 7A corresponds to FIG. 4B in the first exemplary embodiment. However, the user holds the touched point A by the left side finger 402 in FIG. 4A and moves only the right side finger 403 to perform a pinch operation to the right direction (plus direction of the X-axis). As a result, the touched point B, touched point D, and the touched point F are sequentially detected.

FIG. 7B to 7E is an example of a table illustrating information held in the holding unit 113 held in responses to the detection of each touched point. FIG. 7B to 7E corresponds to FIGS. 5A to 5F in the first exemplary embodiment.

In the operation example 2 also, the input area 401 of the touch panel is scanned at each 20 ms, and detected touch events are notified to the detection unit 111. The predetermined time used to determine whether the position information of all the touched points is updated is set to 20 ms, and the threshold value "a" is set to be 10 dots. They have been set in advance.

First, the scanning of the input area 401 is started in a state where the user touches the input area 401, and the touch event of the touched point A is notified from the touch panel. In step S201, the detection unit 111 of the information processing apparatus 100 detects that the touched point A is newly touched. Then, as illustrated in FIG. 7B, the first acquisition unit 112 acquires information that the ID is 1, the position coordinates are (100, 50), and the detection time is 0 ms, and holds the information in the holding unit 113.

In step S202, the determination unit 114 refers to the held information to determine whether the number of touched points detected on the input area 401 is two or more from the number of the IDs. At this time point, as illustrated in FIG. 7B, since only a touched point with the ID 1 is detected (i.e., not two or more touched points) (NO in step S202), the processing ends.

Next, the touch event of the touched point B is notified from the touch panel. In step S201, the first acquisition unit 112 of the information processing apparatus 100 similarly acquires information that the ID is 2, the position coordinates are (110, 40), and the detection time is 5 ms. At that time, the table held in the holding unit 113 is updated as illustrated in FIG. 7C.

In step S202, the determination unit 114 determines that the number of the touched points is two or more. In step S601, the determination unit 114 determines, as it is the processing of the first time, that the information of all the detected touched points is updated (YES in step S601).

In step S204, the decision unit 116 decides that at least one touched point is not moved (NO in step S204). Then, in step S205, from the position coordinates of the touched points, the shortest distance between the two points (distance illustrated in FIG. 7A) is calculated.

Herein, based on the coordinates (100, 50) of the touched point A and the coordinates (110, 40) of the touched point B, the distance between the two points is calculated as 14 dots. The second acquisition unit 115 stores 14 dots as the distance between the two points at the detection starting time in the RAM 103, and the processing ends.

Next, the input area 401 is scanned at each 20 ms, the touch event of the touched point D is notified from the touch panel. It is because, in the touch panel of the modification example 1, a new touch event of the stationary touched point A is not notified.

Therefore, in step S201, the first acquisition unit 112 of the information processing apparatus 100 acquires information that the ID is 2, the position coordinates are (210, 40), and the detection time is 25 ms. Then, the information held in the holding unit 113 is updated as illustrated in FIG. 7D.

At that time, the ID of the touched point D is 2. Since it is the same as that of the touched point B, only the information associated with the ID 2 is updated. In addition, since the position coordinates are different from those of the previous detection time, the movement flag is set. In step S202, since the number of the touched points is 2, it is determined that two or more touched points is detected (YES in step S202).

Then, in step S601, since the touched point with the ID 2 is updated, but the touched point with the ID 1 is not updated, it is determined that the position information of all the touched points is not updated (NO in step S601).

Then, in step S602, it is determined whether 20 ms, since the earliest update was performed among the information of the held touched points, has elapsed. Now, the elapsed time since the earliest update is performed (i.e., since the time when touched point A is detected) is 25 ms, and the elapsed timed exceeds the predetermined time (YES in step S602). Therefore, it may be determined that the position information of all the touched points is updated.

In step S204, based on the movement flag, it is determined that at least one touched point is moved (YES in step S204). In step S206, the second acquisition unit 115 acquires the changed amount of the distance between the touched two points and the absolute value thereof.

Herein, based on the coordinates of the touched point A (100, 50) and the coordinates of the touched point D (210, 40), the distance between the two points (distance D in FIG. 7A) is calculated as 110 dots. The changed amount of the distance (absolute value) from the distance between the two points previously acquired by the second acquisition unit 115 and held in the RAM 103 is calculated as 96 dots (=110−14).

In the present exemplary embodiment, since the threshold value "a" is 10 dots, in step S207, the decision unit 116 decides that the changed amount of the distance between the two points is the threshold value "a" or larger (NO in step S207). Therefore, in step S210, it is determined whether the pinch-out or pinch-in operation has been started.

Now, the changed amount from the distance between the two points acquired by the second acquisition unit 115 is 96 dots. Therefore, the number of the widened times of the distance between the two points is counted as one. However, the counted number is smaller than 2, it is not determined that the pinch-out operation is started (NO in step S210), and the processing is terminated.

Next, the input area 401 is scanned at each 20 ms, the touch event of the touched point F is notified from the touch panel. It is because, in the touch panel of the modification example 1, a new touch event of the stationary touched point A is not notified. Therefore, in step S201, the first acquisition unit 112 of the information processing apparatus 100 acquires information that the ID is 2, the position coordinates are (310, 40), and the detection time is 45 ms. Then, the information held in the holding unit 113 is updated as illustrated in FIG. 7E. At that time, the ID of the touched point C is 2, i.e., identical to that of the touched point B, and therefor the information associated to that of the ID 2 is updated. In addition, since the position coordinates are different from those of the previous detection time, the movement flag is set.

In step S202, the number of touched points is determined to be two, i.e., two or more (YES in step S202). Then, in step S601, since the touched point with the ID 2 is updated, but the touched point with the ID 1 is not updated, it is determined that the position information of all the touched points is not updated (NO in step S601).

Then, in step S602, it is determined whether 20 ms, since the earliest update was performed among the information of the held touched points, has elapsed. Now, the elapsed time since the earliest update is performed (i.e., since the time when touched point A is detected) is 45 ms, and the elapsed timed exceeds the predetermined time (YES in step S602). Therefore, it may be determined that the position information of all the touched points is updated.

In step S204, based on the movement flag, it is determined that at least one touched point is moved (YES in step S204). In step S206, the second acquisition unit 115 acquires the changed amount of the distance between the touched two points and the absolute value thereof.

Herein, based on the coordinates of the touched point A (100, 50) and the coordinates of the touched point D (310, 40), the distance between the two points (distance F in FIG. 7A) is calculated as 210 dots. Then, the changed amount (absolute value) from the distance between two points acquired by second acquisition unit 115 last time and held in the RAM 113, is calculated as 100 dots (=210−110).

In the present exemplary embodiment, since the threshold value "a" is 10 dots, in step S207, the decision unit 116 decides that the changed amount of the distance between the two points is the threshold value "a" or larger (NO in step S207). Therefore, in step S210, the pinch control unit 117 determines whether the pinch-out operation or pinch-in operation is started.

Now, the changed amount from the distance between the two points acquired by the second acquisition unit 115 is 100 dots. Therefore, the number of the widened times of the distance between the two points is counted as 2. In step S210, since the number of broadened times of the distance between the touched two points is two or more, the pinch control unit 117 determines that the pinch-out operation is started (YES in step S210).

In step S211, the pinch control unit 117 notifies to the display control unit 118 that a pinch-out operation is input. Then, in step S212, the result of the pinch operation is output. The display control unit 118 performs the processing to display the enlarged display image based on the result that the distance between the two points is widened from 14 dots of the distance to 210 dots of the distance F.

As described above, according to the modification example 1 of the first exemplary embodiment, when the user touches two points, the multi-touch operation, which is input by the user to the information processing apparatus 100, is determined in response to the elapse of a predetermined time since the earliest position information is updated.

Accordingly, even if when a touch panel that does not notify a new touch event when a detected touched point is stationary is used, it is possible to determine that the position information of all the detected touched points is updated.

Therefore, even when a pinch operation is performed by moving one touched point of the two touched points while the user keeps another one stationary, the user can change the size of the display image to meet the user's intention.

In a second exemplary embodiment, an example multi-drag operation input by a user is described as an example of the multi-touch operation input by a user. In the first exemplary embodiment, it is determined that whether a multi-drag operation or pinch operation is input based on whether the changed amount of the distance between two points changed by the movement of at least one touched point is smaller than a predetermined threshold value, as a result of the update of the position information of the detected two points.

On the other hand, in the second exemplary embodiment, it is determined that whether a multi-drag operation or pinch operation is input based on whether the angle difference in the movement directions changed by the movement of at least one touched point is smaller than a predetermined threshold value, as a result of the update of the position information of the detected two points.

At that time, when the angle difference is small and the touched points of the two fingers are supposed to have been moved almost in a same direction, it is determined that the multi-drag operation is input. On the other hand, when the angle difference is large, it is determined that the pinch operation is input.

FIG. 8 is a function block diagram illustrating a function configuration of the information processing apparatus 100 according to the modification example 1. FIG. 8 is different from FIG. 1B in that a generation unit 801 and a third acquisition unit 802 are added.

The generation unit 801 holds information necessary to generate vectors among information of the touched points acquired by the first acquisition unit 112. The generation unit 801 generates a movement vector indicating a movement direction and an amount of movement for each touched point based on the shift of the position information of the touched point.

The third acquisition unit 802 compares the direction components of each of the movement vectors for each touched point generated by the generation unit 801 to acquire the angle difference. Then, the decision unit 116 according to the present exemplary embodiment decides that the operation performed by the user is a pinch operation (first operation) if the angle difference of the movement vectors acquired by the third acquisition unit 802 is a predetermined threshold value or larger.

On the other hand, if the acquired angle difference is smaller than the predetermined threshold value, it is determined that the operation performed by the user is a multi-drag operation (second operation).

FIG. 9 is a flowchart illustrating a flow, which is performed by the information processing apparatus 100 in the second exemplary embodiment, for recognizing a multi-touch operation. In the steps with the same numerals as those in FIG. 2, the same processing is performed. Therefore, details thereof are not described and the different portions from the first exemplary embodiment will be described.

In the second exemplary embodiment, in step S204, if the decision unit 116 decides that at least one touched point is moved (YES in step S204), the processing proceeds to step S901. In step S901, the third acquisition unit 802 acquires the angle difference of the movement vectors. The details of the processing performed in step 901 will be described below.

Then, in step S902, the decision unit 116 decides whether the angle difference of two movement vectors generated by the generation unit 801 is smaller than a threshold value "b". In the present exemplary embodiment, the threshold value "b" is a threshold value for a degree of angle registered in the information processing apparatus 100 in advance. It is set to be a minimum value required to decide that the two touched points are moved in different directions.

If the angle difference is the threshold value "b" or larger (NO in step S902), the decision unit 116 decides that the operation input by the user is a pinch operation, and the processing proceeds to step S210.

If the angle difference is smaller than the threshold value "b" (YES in step S902), the decision unit 116 decides that the operation input by the user is a multi-drag operation, and the processing proceeds to step S208.

In step S902 of the second exemplary embodiment, if it is determined that the user inputs a pinch operation, then in step S210, the second acquisition unit 115 acquires the distance between the touched two points and compares it with the held distance. Then, based on whether the distance between the two points is widened or narrowed, the processing similar to that of the first exemplary embodiment is performed.

Figure 10:
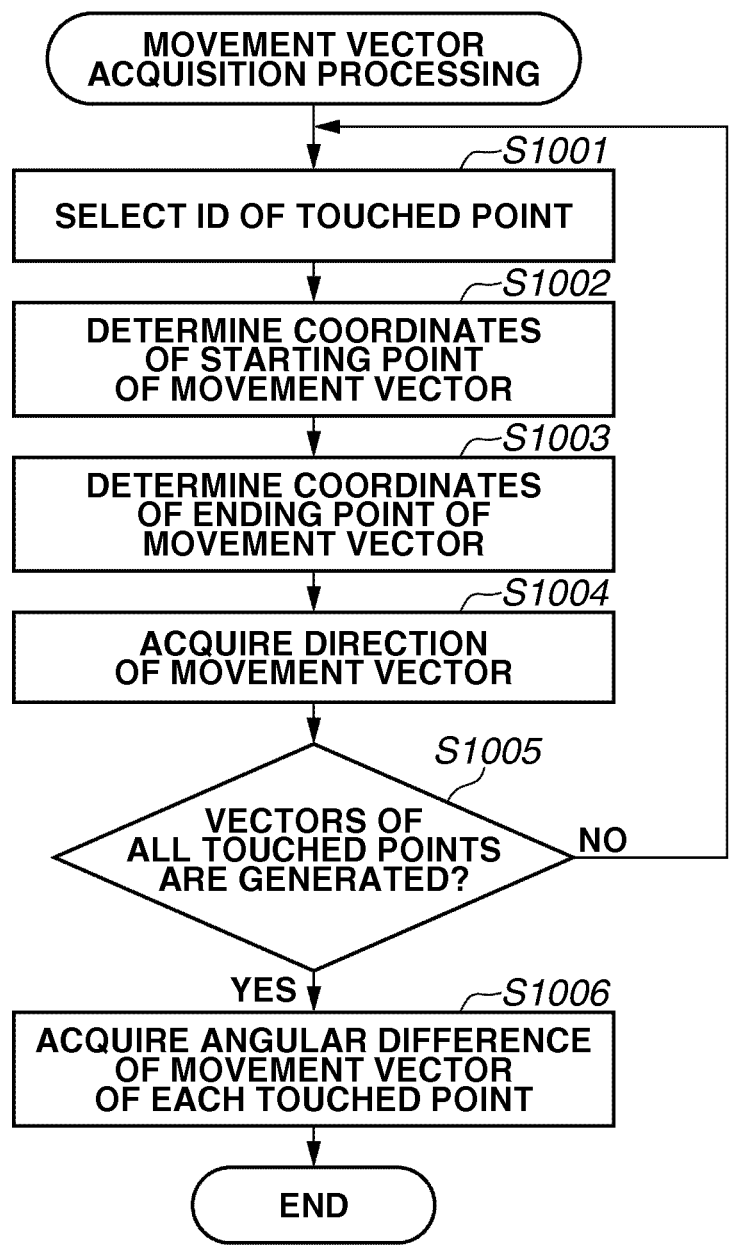
FIG. 10 is a flowchart illustrating an example flow of movement vector generation processing performed by the information processing apparatus.

FIG. 10 is a flowchart illustrating an example processing flow for acquiring the angle difference of movement vectors of the touched points performed in step S901. First, in step S1001, the generation unit 801 selects the ID of a touched point to specify one touched point of the detected plurality of touched points.

In step S1002, the generation unit 801 determines the coordinates to be a starting point of a position vector. In the present exemplary embodiment, the generation unit 801 determines the position of the touched point with the selected ID detected first time or the position detected last time, based on the position information of the held touched point, as the coordinates of the starting point of the position vector.

In step S1003, the generation unit 801 determines the coordinates of the ending point of the movement vector. In the present exemplary embodiment, the generation unit 801 determines the latest position information of the touched point with the selected ID as the coordinates of the ending point of the movement vector, based on the information acquired by the first acquisition unit 112.

Then, in step S1004, the generation unit 801 acquires information indicating the direction of the movement vector directing from the determined starting point to the determined ending point. At that time, the generation unit 801 generates the movement vector by connecting the determined starting point and the ending point. However, the movement vector when the starting point and the ending point have the same coordinates is defined as a 0 vector.

Then, the generation unit 801 calculates the angle in a clockwise direction indicating the direction of the generated movement vector using the Y-axis of the input area 401 as a reference. The calculation of the angle can be performed by using, for example, a trigonometric function such as a tangent. The generation unit 801 holds the acquired information of the angle by associating it with the ID of the touched point.

In step S1005, the third acquisition unit 802 determines whether the movement vectors of all the touched points are generated. The third acquisition unit 802 performs the determination based on the number of IDs held in the generation unit 801.

If the third acquisition unit 802 determines that the vectors of all the touched points are generated (YES in step S1005), the processing proceeds to step S1006. On the other hand, if the third acquisition unit 802 determines that the vectors of all the touched points are not generated (NO in step S1005), the processing returns to step S1001. In step S1001, an ID of the touched point to be processed next is selected.

In step S1006, the third acquisition unit 802 acquires the angle difference of the movement vectors for each touched point. The third acquisition unit 802 calculates the difference of the angles of the vectors. The angles held in the generation unit 801 indicate the directions of the vectors. The obtained angle difference is an absolute value. Then, the calculation processing of the angle difference of the movement vectors ends, and the processing proceeds to step S902. The subsequent processing is performed similar to that of the first exemplary embodiment.

FIGS. 11A to 11F are diagrams illustrating an example generation method of the movement vectors of a touched point performed in step S901. Referring to FIG. 11A, a specific example of the movement vectors generated in the present exemplary embodiment is described.

In FIGS. 11A to 11F, p1 to p8 are touched points of the input area 401 and the user's finger subjected to sampling at constant time intervals the coordinates of the positions at which the user's finger touches the input area 401. p1 corresponds to the position detected first.

In the present exemplary embodiment, the touch panel scans the input area 401 at each 20 ms. Therefore, the touched point can be obtained at about 20 ms intervals. The generation unit 801 generates a movement vector V1a when p2 is detected. Similarly, a movement vector V2a is generated when p3 is detected, and a movement vector V3a is generated when p4 is detected.

The generation method of the movement vectors is not limited to the method used in the present exemplary embodiment. Referring to FIGS. 11B to 11D, other example generation methods are described below.

Referring to FIG. 11B, a method is described in which when the length of the generated movement vector exceeds the reference distance L, the detected position of the touched point that is the ending point of the movement vector is set to be the starting point of a movement vector to be generated by the next processing.

Herein, p1 to p4 are touched points sampled at constant time intervals and p1 corresponds to the position of the touched point detected first. The generation unit 801 determines the coordinates of p1 detected first as the starting point of the movement vector when p1 and p2 are detected. When p2 is detected, the generation unit 801 generates the movement vector directing from p1 as the starting point to the p2 as the ending point, and determines whether the length of the generated movement vector (movement length from p1 to p2) exceeds the reference distance L.

When the length of the generated movement vector exceeds the reference distance L, the latest detected position of the touched point is determined to be the coordinates of the starting point when the movement vector is generated next. Because the length of the generated movement vector (movement length from p1 to p2) does not exceed the reference distance L, when p3 is detected, the movement vector V1b is generated. Then, when p3 is detected, the generation unit 801 determines whether the length of the movement vector V1b exceeds the reference distance L.

Because the length of the movement vector V1b exceeds the reference distance L, the generation unit 801 determines p3 as the starting point of the movement vector when the movement vector is generated next.

Then, when p4 is detected, the generation unit 801 generates the movement vector V2b directing from p3 as the starting point to the p4 as the ending point. In this way, the generation unit 801 generates a movement vector for each touched point, and the third acquisition unit 802 acquires the angle difference using the latest movement vector generated for each touched point. The generation unit 801 may discard the information of the touched points which is not required for generating the vectors and the information of the movement vectors which is not latest.

FIG. 11C illustrates an example in which the generation unit 801 determines the point at which the moving speed of the touched point becomes local minimum as the coordinates of the starting point to generate the movement vector.

Herein, p1 to p8 are touched points sampled at constant time intervals. Since the sampling time intervals are constant, the distance between the touched points in FIG. 11C is proportional to the movement speed of the touched point. Therefore, it can be seen that at p6 the movement speed becomes local minimum from the shifts of the touched points from p1 to p8.

Therefore, the generation unit 801 determines p1 as the starting point of the movement vector in the processing when p1 to p6 are detected, and for example, when p6 is detected, the generation unit 801 generates the movement vector V1c. Then, in the processing executed when the points subsequent to p7 are detected, the generation unit 801 determines p6 as the starting point, and for example, when p8 is detected, the generation unit 801 generates the movement vector V2c.

However, the position coordinates of touched points acquired from the touch panel sensor may include variations. For example, the contact area between the user's finger and the touch panel may change while operating, and the relative position of the coordinates of one point specified as the touched point may change. When the movement vector is generated without considering such variations, the direction of the movement vector may depend on the variation of detections, and the accuracy of the processing to compare the angle difference and the threshold value "b" may deteriorate.

To solve this problem, referring to FIG. 11D, an example is described in which the movement vector is generated considering coordinates of all the shifts of the touched points between the coordinates determined as the starting point and the latest detected position as the ending point.

In the present exemplary embodiment, the coordinates of p1 which is detected first is determined as the starting point. As the coordinate as the ending point, the X coordinate is determined to be the X-coordinate of the latest detected position of the touched point, and the Y-coordinate is determined to be the average value of the Y-axis coordinates of the positions of the touched points with the same ID detected until now.

In this way, the accuracy of the comparison processing of the angle difference of the movement vectors and the threshold value "b" can be enhanced by generating the movement vectors using the average value of the coordinates of the detected touched point. Thus, it is possible to recognize the multi-touch operation correctly.

The above-described generation method of the movement vectors is just an example. For example, it is also possible to determine the coordinates of the starting point of the movement vector to be generated next based on that the angle difference of the directions of the generated movement vectors has become a predetermined threshold value or larger, or touched point has not moved for a predetermined time period or longer. Thus, among various methods, it is possible to select an appropriate method according to the calculation ability of the information processing apparatus 100 and the like, and to be used for the present exemplary embodiment.

An operation example 3 is described in which a user operates the information processing apparatus 100 according to the second exemplary embodiment.

In the operation example 3, similar to the operation example 1, a user touches the input area 401 with two fingers 402 and 403 and moves them together in the right direction (multi-drag operation) as illustrated in FIG. 4A. Then, the touched point of each finger shifts as illustrated in FIG. 4B.

At that time, the information of each touched point acquired by the first acquisition unit 112 is held in the holding unit 113 as tables illustrated in FIGS. 5A to 5F. In the operation example 3, the threshold value "b" of the angle is set to 45 degrees.

The difference of the operation example 3 from the operation example 1 resides in the processing performed after it is determined in step S204 that at least one touched point is moved (YES in step S204) in response to the notification of the touch event of the touch point D received from the touch panel. In step S901, the generation unit 801 generates, with respect to the touched point whose ID is 1, the movement vector A with the position of the touched point A as the coordinates of the starting point and with the position of the touched point C as the coordinates of the ending point.

The direction of the movement vector A is 90 degrees when the angle is calculated in a clockwise direction from the Y-axis as a reference. Similarly, the generation unit 801 generates, with respect to the touched point whose ID is 2, the movement vector B with the position of the touched point B as the coordinates of the starting point and with the position of the touched point D as the coordinates of the ending point.

The direction of the movement vector B is also 90 degrees in the clockwise direction from the Y-axis as a reference. Therefore, the third acquisition unit 802 acquires the information indicating 0 degrees as the angle difference between the movement vector A and the movement vector B.

In the present exemplary embodiment, the threshold value "b" is 45 degrees. Therefore, in step S902, the decision unit 116 decides that the angle difference 0 degrees acquired by the third acquisition unit 802 is smaller than the threshold value "b" (YES in step S902). In other words, it is determined that the user inputs a multi-drag operation because the two touched points are moved in the same direction. Therefore, in step S208 and step S209, the processing corresponding to the multi-drag operation is performed.

Similarly, in the processing performed when a touch event of the touched point F is notified from the touch panel, the generation unit 801 generates the movement vector C illustrated in FIG. 4B with respect to the touched point whose ID is 1, and the movement vector D illustrated in FIG. 4B with respect to the touched point whose ID is 2. The direction of each vector is 90 degrees and the angle difference is 0 degrees. Therefore, the decision unit 116 decides that the multi-drag operation is input.

In the processing to acquire the angle difference performed in step S1006 of the present exemplary embodiment, the calculation result may desirably be the absolute value. By using the absolute value, only the degree of the angle difference is considered and the direction of the angle difference is not considered.

Further, in order to calculate the angle difference in an acute angle, if the calculation result is larger than 180 degrees, it is desirable to subtract the calculation result from 360 degrees to obtain the angle difference. By unifying the angle differences in the acute angle, it is possible to keep uniformity of the comparison processing with the threshold value, and the operation visually easy to understand by the user can be obtained.

Further, in the comparison between the angle difference of the movement vector and the threshold value of the angle, a plurality of threshold values may be set. For example, according to the distance between the starting point and the ending point, if the distance is short, a threshold value of a large angle is used. In this way, even if the variation of the detected position of the touched point as described above occurs, it is possible to prevent deterioration in determination accuracy caused by the error of the angle acquired as the direction of the movement vector being large.

FIG. 11E illustrates the direction difference between the movement vectors V1$e$ and V1$e'$. The movement vector V1$e$ is generated when p2 is detected after p1 is detected. The vector Ve1' is generated when p2' is detected due to the variation of the detected position. On the other hand, FIG. 11F illustrates the direction difference between the movement vectors V2$e$ and V2$e'$. The movement vector V2$e$ is generated when p3, which is separated from p2, is detected after p1 is detected. The vector V2$e'$ is generated when p3' is detected.

The variation of the detected position between p3 and p3' is the same as that between p2 and p2'. The difference of the directions between V1$e$ and V1$e'$ is larger than that of V2$e$ and V2$e'$.

Thus, as the distance from the starting point to the ending point is shorter, the variation of the detected position affects the direction of the movement vector largely. Accordingly, by setting a plurality of threshold values according to the distance from the starting point to the ending point, it is possible to determine the input multi-touch operation correctly.

As described above, in the present exemplary embodiment, when the user touches two points, the multi-touch operation input to the information processing apparatus 100 by the user is determined in response to the completion of the update of the position information of all two touched points. At that time, it is determined that whether a multi-drag operation or pinch operation is input based on whether the angle difference in the movement directions changed by the movement of at least one touched point is smaller than a predetermined threshold value, as a result of the update of the position information of the detected two points.

In this way, when the user moves the two touched points in almost the same direction, the pinch operation is not erroneously notified. As a result, the false operation in which the size of the display image is changed against the user's intention is prevented. In addition, the first exemplary embodiment and the modification examples, and the second exemplary embodiment may be implemented in combination.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-041603 filed Feb. 28, 2012, which is hereby incorporated by reference herein in its entirety.

What is claimed is:

1. An information processing apparatus configured to recognize a multi-touch operation, the information processing apparatus comprising:
   an input information acquisition unit configured to repetitively acquire, in a situation where two touched points are detected on a touch detection area, a position of each of the two touched points sequentially one by one;
   a holding unit configured to hold, each time a latest position of one of the two touched points has been newly acquired by the input information acquisition unit a position of the one of the two touched points having been updated with a latest position in a memory;
   a determination unit configured to determine whether all positions of the two touched points held in the memory are updated with latest positions each time a position of one of the two touched points is acquired by the input information acquisition unit; and
   a distance acquisition unit configured to acquire an amount of distance between positions of the two touched points based on the positions of the two touched points being held in the memory in a case where the determination unit determines that all positions of the two touched points held in the memory are updated with the latest positions;
   a decision unit configured to decide a type of input to the information processing apparatus using the amount of distance between positions of the two touched points acquired by the distance acquisition unit, the type of input being one of a first operation where the amount of distance between the positions of the two touched points is changed, and a second operation where the two touched points are moved in a same direction and the amount of distance between the positions of the two touched points is unchanged;
   a display control unit configured to cause a display unit to display one of a plurality of images stored in a predetermined order,
   wherein the display control unit causes the display unit to enlarge or reduce the displayed image, in response to a decision by the decision unit that input by the two touched points is the first operation and selects, from within the plurality of images stored in the predetermined order, an image at a position within the predetermined order that is not adjacent to the displayed image, and cause the display unit to display the selected image in response to a decision by the decision unit that input by the two touched points is the second operation, and
   wherein the holding unit, the input information acquisition unit, the determination unit, the distance acquisition unit, the decision unit and the display control unit are implemented by at least one processor in the information processing apparatus.

2. The information processing apparatus according to claim 1, wherein the input information acquisition unit is configured to identify the two touched points and alternately acquire a position of each of the two touched points.

3. The information processing apparatus according to claim 1, further comprising an angle acquisition unit configured to acquire an angle difference of movement directions of the two touched points based on the positions held in the holding unit,
wherein the decision unit decides that the first operation has been input to the information processing apparatus based on an angle difference of movement directions acquired by the angle acquisition unit having been an angle threshold value or larger, and decides that the second operation has been input to the information processing apparatus based on the angle difference of the movement directions acquired by the angle acquisition unit having been smaller than the angle threshold value,
wherein the angle acquisition unit is implemented by at least one processor in the information processing apparatus.

4. The information processing apparatus according to claim 3, further comprising a generation unit configured to generate a movement vector for each of the two touched points based on a shift of the positions of each of the plurality of touched points held in the holding unit,
wherein the angle acquisition unit acquires the angle difference of the movement directions of the two touched points based on the direction of each movement vector of the two touched points generated by the generation unit,
wherein the generation unit is implemented by at least one processor in the information processing apparatus.

5. A non-transitory computer-readable storage medium storing a computer-executable program, when read and executed by a computer, for causing the computer to operate as an information processing apparatus configured to recognize a multi-touch operation, the information processing apparatus comprising:
   an input information acquisition unit configured to repetitively acquire, in a situation where two touched points are detected on a touch detection area, a position of each of the two touched points sequentially one by one;
   a holding unit configured to hold, each time a latest position of one of the two touched points has been newly acquired by the input information acquisition unit a position of the one of the two touched points having been updated with a latest position in a memory;
   a determination unit configured to determine whether all positions of the two touched points held in the memory are updated with latest positions each time a position of one of the two touched points is acquired by the input information acquisition unit; and
   a distance acquisition unit configured to acquire an amount of distance between positions of the two touched points based on the positions of the two touched points being held in the memory in a case where the determination unit determines that all positions of the two touched points held in the memory are updated with the latest positions;
   a decision unit configured to decide a type of input to the information processing apparatus using the amount of distance between positions of the two touched points acquired by the distance acquisition unit, the type of input being one of a first operation where the amount of distance between the positions of the two touched points is changed, and a second operation where the two touched points are moved in a same direction and the amount of distance between the positions of the two touched points is unchanged;

a display control unit configured to cause a display unit to display one of a plurality of images stored in a predetermined order, wherein the display control unit causes the display unit to enlarge or reduce the displayed image, in response to a decision by the decision unit that input by the two touched points is the first operation and selects, from within the plurality of images stored in the predetermined order, an image at a position within the predetermined order that is not adjacent to the displayed image, and cause the display unit to display the selected image in response to a decision by the decision unit that input by the two touched points is the second operation, and wherein the holding unit, the input information acquisition unit, the determination unit, the distance acquisition unit, the decision unit and the display control unit are implemented by at least one processor in the information processing apparatus.

6. A control method for an information processing apparatus configured to acquire position information of one or more touched points one by one detected according to a predetermined detection period on a touch panel, the method comprising:

repetitively acquiring, in a situation where two touched points are detected on a touch detection area, a position of each of the two touched points sequentially one by one;

holding, each time a latest position of one of the two touched points has been newly acquired, a position of the one of the two touched points having been updated with a latest position in a memory determining whether all positions of the two touched points held in the memory are updated with latest positions each time a position of one of the two touched points is acquired; and acquiring an amount of distance between positions of the two touched points based on the positions of the two touched points being held in the memory in a case where it is determined that all positions of the two touched points held in memory are updated with the latest positions;

deciding a type of input to the information processing apparatus using the amount of distance between positions of the two touched points acquired by the distance acquisition unit, the type of input being one of a first operation where the amount of distance between the positions of the two touched points is changed, and a second operation where the two touched points are moved in a same direction and the amount of distance between the positions of the two touched points is unchanged;

enlarging or reducing an image displayed on a display unit in response to a decision that input by the two touched points is first operation, and selecting an image from a plurality of images stored in a predetermined order, the selected image being in a position within the predetermined order that is not adjacent to a currently displayed image being displayed on the display unit and displaying the selected image in response to a decision that input by the two touched points is second operation.

7. The information processing apparatus according to claim 1, wherein the decision unit is configured not to decide which of the plurality of predetermined multi-touch operations has been input to the information processing apparatus, at a time when a position of a first touched point of positions of the two touched points being held in the memory has been updated with a latest position of the first touched point, and to decide which of the plurality of predetermined multi-touch operations has been input to the information processing apparatus, at a time when a position of a second touched point of positions of the two touched points being held in the memory has been updated with a latest position of the first touched point.

8. An information processing apparatus configured to recognize a multi-touch operation, the information processing apparatus comprising:

a touch information acquisition unit configured to repetitively acquire, in a situation where two touched points are detected on a touch detection area, a position of each of the two touched points sequentially one by one;

a holding unit configured to hold information indicating that touched points have been newly acquired one by one by the touch information acquisition unit;

a determination unit configured to determine, by using the information indicating that touched points have been newly acquired, whether all positions of the two touched points are updated with latest positions, wherein the determination is performed after processing by the touch information acquisition unit has been completed; and a distance acquisition unit configured to acquire an amount of distance between positions of the two touched points based on the positions of the two touched points being held in the memory in a case where the determination unit determines that all positions of the two touched points held in memory are updated with the latest positions;

a decision unit configured to decide a type of input to the information processing apparatus using the amount of distance, between positions of the two touched points, acquired by the distance acquisition unit, the type of input being one of a first operation where the amount of distance between the positions of the two touched points is changed, and a second operation where the two touched points are moved in a same direction and the amount of distance between the positions of the two touched points is unchanged;

a display control unit configured to cause a display unit to display one of a plurality of images stored in a predetermined order, wherein the display control unit causes the display unit to enlarge or reduce the displayed image, in response to a decision that input by the two touched points is the first operation and selects, from within the plurality of images stored in the predetermined order, an image at a position within the predetermined order that is not adjacent to the displayed image, and cause the display unit to display the selected image in response to a decision that input by the two touched points is the second operation, and wherein the holding unit, the determination unit, the distance acquisition unit, the decision unit and the display control unit are implemented by at least one processor in the information processing apparatus.

* * * * *